(12) United States Patent
Kirch

(10) Patent No.: US 11,270,127 B1
(45) Date of Patent: *Mar. 8, 2022

(54) SYNCHRONIZED PULSES IDENTIFY AND LOCATE TARGETS RAPIDLY

(71) Applicant: Marc Joseph Kirch, Berkeley, CA (US)

(72) Inventor: Marc Joseph Kirch, Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/300,266

(22) Filed: May 5, 2021

(51) Int. Cl.
*G01S 7/28* (2006.01)
*G06K 9/00* (2022.01)
*G06N 3/04* (2006.01)
*H04L 67/1097* (2022.01)
*G06K 9/52* (2006.01)
*G06F 1/08* (2006.01)
*G01S 17/42* (2006.01)
*G01S 17/06* (2006.01)
*G01S 7/483* (2006.01)

(52) U.S. Cl.
CPC ............ *G06K 9/00744* (2013.01); *G01S 7/28* (2013.01); *G01S 7/483* (2013.01); *G01S 17/06* (2013.01); *G01S 17/42* (2013.01); *G06F 1/08* (2013.01); *G06K 9/52* (2013.01); *G06N 3/049* (2013.01); *H04L 67/1097* (2013.01)

(58) Field of Classification Search
CPC ........ G06K 9/00744; G06K 9/52; G01S 7/28; G01S 7/483; G01S 17/06; G01S 17/42; G06F 1/08; G06N 3/049; H04L 67/1097
See application file for complete search history.

(56) References Cited

U.S. PATENT DOCUMENTS

| | | | |
|---|---|---|---|
| 5,495,512 | A | 2/1996 | Kovacs et al. |
| 6,404,770 | B1* | 6/2002 | Fujimori ........... H04L 12/40052 370/389 |
| 6,581,046 | B1 | 6/2003 | Ahissar |
| 6,636,526 | B1* | 10/2003 | Nyu ................. H04L 12/40013 370/445 |
| 7,624,085 | B2 | 11/2009 | Hawkins et al. |
| 8,085,639 | B2 | 12/2011 | Honma |
| 8,346,692 | B2 | 1/2013 | Rouat et al. |
| 8,566,265 | B1* | 10/2013 | Cruz-Albrecht ....... G06N 3/049 706/27 |
| 8,878,579 | B2 | 11/2014 | Kurd et al. |
| 9,342,873 | B1 | 5/2016 | Barron |

(Continued)

OTHER PUBLICATIONS

U.S. Appl. No. 62/497,726, filed Dec. 2016, Kirch, M.

(Continued)

*Primary Examiner* — Aaron W Carter

(57) ABSTRACT

Stimulation of a sensor array, by edges comprising a feature pattern, optical characters or moving edge(s), emits pulses that converge at nodes in serial arrays, which reemit rapidly if input pulses are in temporal synchrony. The repetitive pulses traverse the serial arrays without encoding image features in a temporal data stream that decodes as an image frame. This dimensional reduction of serial arrays reemits convergent one-dimensional (1D) pulses in greater numbers when stimulus feature patterns match sensor or node topographical patterns, thereby serially extracting context, optical flow and inference. Reemitted 1D pulses rapidly identify and locate looming targets without repetitive feedback.

20 Claims, 9 Drawing Sheets

(56) References Cited

U.S. PATENT DOCUMENTS

| | | | |
|---|---|---|---|
| 9,405,975 B2 | 8/2016 | Izhikevich | |
| 9,530,091 B2 | 12/2016 | Hawkins et al. | |
| 9,843,339 B1* | 12/2017 | Kuan | G06F 1/12 |
| 10,769,447 B1* | 9/2020 | Kirch | G06F 1/08 |
| 2002/0181799 A1* | 12/2002 | Matsugu | G06K 9/00281 382/260 |
| 2008/0125832 A1* | 5/2008 | Horsager | A61N 1/36046 607/54 |
| 2009/0312818 A1* | 12/2009 | Horsager | A61N 1/0543 607/54 |
| 2010/0016732 A1* | 1/2010 | Wells | A61B 5/4029 600/476 |
| 2011/0142066 A1* | 6/2011 | Kasai | H04L 12/4035 370/442 |
| 2012/0303091 A1* | 11/2012 | Izhikevich | G16H 40/63 607/54 |
| 2012/0308076 A1* | 12/2012 | Piekniewski | G06N 3/049 382/103 |
| 2012/0308136 A1* | 12/2012 | Izhikevich | G06N 3/008 382/181 |
| 2013/0073497 A1 | 3/2013 | Akopyan et al. | |
| 2013/0289668 A1* | 10/2013 | Nirenberg | G06K 9/605 607/88 |
| 2014/0064609 A1* | 3/2014 | Petre | G06K 9/4628 382/159 |
| 2014/0152995 A1* | 6/2014 | Dong | G01D 18/00 356/477 |
| 2016/0263379 A1* | 9/2016 | Nirenberg | A61F 9/08 |
| 2019/0227490 A1* | 7/2019 | Waller | G03H 1/2249 |
| 2019/0231204 A1* | 8/2019 | Heydari | G06F 3/015 |
| 2021/0063964 A1* | 3/2021 | Marshel | G03H 1/2286 |
| 2021/0168223 A1* | 6/2021 | Sarikaya | H04L 69/04 |

OTHER PUBLICATIONS

Babadi, B. & Sompolinsky, H. Sparseness and expansion in sensory representations. (2014) Neuron 83:1213-26.

Buzsaki, G., Logothetis, N., Singer, W. Scaling brain size, keeping timing: evolutionary preservation of brain rhythms. (2013) Neuron 80:751-64.

Chang, L. & Tsao, D. The code for facial identity in the primate brain. (2017) Cell 169:1013-28.

Chicca, E., Stefanini, F., Bartolozzi, C., Indiveri, G. Neuromorphic electronic circuits for building autonomous cognitive systems. (2014) Proc. of the IEEE 102:1367.

Churchland, M., Cunningham, M., Kaufman, M., Foster, J., Nuvujukian, P., Ryu, S., Shenoy, K. Neural population dynamics during reaching. (2012) Nature 487:51.

Clarke, C., Naud, R., Longtin, A., Maier, L. Speed-invariant encoding of looming object distance requires power law spike rate adaptation (2013) PNAS 110:13624-13629.

Dean, H., Hagan, M., Pesaran, B. Only coherent spiking in posterior parietal cortex coordinates looking and reaching. (2012) Neuron 73:829-41.

Dehaene, S., Cohen, L., Sigman, M., Vinckier, F. The neural code for written words: a proposal. (2005) Tr. Cogn. Sci. 9:335-341.

Eyal, G., Mansvelder, H., De Kock, C., Seger, I. Dendrites impact the encoding capacities of the axon. (2014) J. Neurosci. 34:8063-71.

Goodale, M., Pelisson, D., Prablanc, C. Large adjustments in visually guided reaching do not depend on vision of the hand or perception of target displacement. (1986) Nature 320:748-50.

Greschner, M., Bongard, M., Rujan, P., Ammermuller, J. Retinal ganglion cell synchronization by fixational eye movements improves feature estimation. (2002) Nature Neurosci. 5:341-7.

Gur, M. & Snodderly, D. A dissociation between brain activity and perception: chromatically opponent cortical cells signal chromatic flicker that is not perceived. (1997) Vision Res. 37:377-82.

Harvey, M., Saal, H., Dammann, J., Bensmaia, S. Multiplexing stimulus information through rate and temporal codes in primate somatosensory cortex. (2013) PLoS Biol. 11:e1001558.

Hung, C., Kreiman, G., Poggio, T., Dicarlo, J. Fast readout of object identity from macaque inferior cortex. (2005) Science 310:863-6.

Jackson, C. Woodwind design using microwave theory. (2001) IEEE Microwave Magazine 2(3):45-49.

Kara, P. & Reid, R. Efficacy of retinal spikes in driving cortical responses. (2003) J. Neurosci. 23:8547-57.

Kaufman, M., Seely, J., Sussillo, D., Ryu, S., Shenoy, K. Churchland, M. The largest response component in the motor cortex reflects movement timing but not movement type. (2016) eNeuro. 3:e0085-16.

Kehoe, B., Berenson, D., Goldberg, K. Estimating part tolerance bounds based on adaptive cloud-based grasp planning with slip. (2012) 8th IEEE Intl. Conf. Autom. Science Engin. pp. 1106-1113.

Kirch, M. *Synchronous Neural Time* KDP Publishing (2018) pp. 52-53, 84-128,136-205, 218-249.

Koepsell, K., Wang, X., Vaingankar, V., Rathbun, D., Usrey, W., Hirsch, J., Sommer, F. Retinal oscillations carry visual information to cortex (2009) Front. Syst. Neurosci. Epub. 3:4.4.

Lachaux, J.-P., Jerbi, K., Bertrand, O., Minotti, L., Hoffmann, D., Schoendorff, B, Kahane, P. A blueprint for real-time functional mapping via human intracranial recordings. (2007) PLoS One, 2:e1094.

Laughlin, S. A simple coding procedure enhances a neuron's information capacity (1981) Z. Naturforsch. C Biosci. 36:910-2.

Lecun, Y., Bengio, Y., Hinton, G. Deep learning. (2015) Nature 521:436-44.

Li, P., Field, G., Greschner, M., Ahn, D., Gunning, D., Mathieson, K., Sher, A., Litke, A., Chichilnisky, E. Retinal representation of the elementary visual signal. (2014) Neuron 81:130-9.

Maldonado, P., Babul, C., Singer, W., Rodriguez, E., Berger, D., Grun, S. Synchronization of neural responses in primary visual cortex of monkeys viewing natural images. (2008) J. Neurophys. 100:1523-32.

Martinez-Conde, S., Macknik, S., Hubel, D. The role of fixational eye movements in visual perception. (2004) Nature Rev. Neurosci. 5:229-40.

Masquelier, T. Relative spike time coding and STDP-based orientation selectivity in the early visual system in natural continuous and saccadic vision: a computational model. (2012) J. Comp. Neurosci. 32:425-441.

Matias, F., Gollo, L., Canelli, P., Bressler, S., Capelli, M., Mirasso, C. Modeling positive Granger causality and negative phase lag between cortical areas (2016) Neuroimage 99:411-8.

Mizuseki, K. & Buzsaki, G. Theta oscillations decrease spike synchrony in the hippocampus and entorhinal cortex. (2013) Philos. Trans. R. Soc. Lond. B Biol. Sci. 369:20120530.

Mizuseki, K., Sirota, A. Pastelkova, E., Buzsaki, G. Theta oscillations provide temporal windows for local circuit computation in the entorhinal-hippocampal loop. (2009) Neuron 64:267-80.

Mukamel, E. & Schnitzer, M. Retinal coding of visual scenes—repetitive and redundant too? (2005) Neuron 46:357-9.

Osswald, M., Ieng, S-H., Benosman, R., Indiveri, G., A spiking neural network model of 3D perception for event based neuromorphic stereovision. (2017) Sci. Rprts. 7:4070.

Parise, C., Spence, C., Ernst, M. When correlation implies causation in multisensory integration. (2012) Curr. Biol. 22:46-9.

Pitkow, X., Liu, S., Angelaki, D., Deangeles, G., Pouger, A. How can single sensory neurons predict behavior? (2015) Neuron 87:411-23.

Pouille, F. & Scanziani, M. Enforcement of temporal fidelity in pyramidal cells by somatic feedforward inhibition. (2001) Science 293:1159-63.

Read, J. & Cumming, B. Effect of interocular delay on disparity-selective V1 neurons: relationship to stereoacuity and the Pulfrich effect. (2005) J. Neurophys. 94:1541-53.

Reifenstein, E., Stemmler, M., Herz, A., Kempfer, R., Schreiber, S. Movement dependence and layer specificity of entorhinal phase precession in two-dimensional environments. (2014) PLoS One 9:e100638.

Reinagel, P. & Reid, R.C. Temporal coding of visual information in the thalamus (2000) J. Neurosci. 20:5392-400.

(56) References Cited

OTHER PUBLICATIONS

Roelfsema, P., Engel, A., Konig, P., Singer, W. Visuomotor integration is associated with zero time-lag synchronization among cortical areas. (1997) Nature 385:157-61.
Shiozaki, H., Tanabe, S., Doi, T., Fujita, I. Cortical activity in cortical area V4 underlies fine disparity discrimination. (2012) J. Neurosci. 32:3830-41.
Stanley, K. & Miikkulainen, R. Evolving neural networks through augmented topologies. (2002) Evolutionary Computation 10:99-127.
Sugase, Y., Yamane, S. Ueno, S., Kawano, S. Global and fine information coded by neurons in the temporal visual cortex. (1999) Nature 400:869-72.
Traub, R., Whittington, M., Stanford, I., Jefferys, J. A mechanism for generation of long-range synchronous fast oscillations in the cortex. (1996) Nature 383:621-4.
Tsunoda, K., Yamane, Y., Nishizaki, N., Tanifuji, M. Complex objects are represented in macaque inferotemporal cortex by the combination of feature columns. (2001) Nature Neurosci. 4:832-8.
Umeda, K., Tanabe, S., Fujita, I. Representation of stereoscopic depth based on relative disparity in macaque area V4. (2007) J. Neurophys. 98:241-52.
Van Ee, R. & Erkelens, C. Stability of binocular depth perception with moving head and eyes. (1996) Vis. Res. 36:3827-42.
Varela, F., Lachaux, J-P., Rodriguez, E., Martinerie, J. The brain web: phase synchronization and large-scale integration. (2001) Nature Rev. Neurosci. 2:229-39.
Wedeen, V., Rosene, D., Wang, R., Dai, G., Mortazavi, F., Hagmann, P., Kaas, J., Tseng, W-Y. The geometric structure of the brain fiber pathways. (2012) Science 335:1628-34.
Zheng, Y. & Qian, W-H. Coping with grasping uncertainties in force-closure analysis. (2005) Intl. J. Robotics Res. 24:311-27.

\* cited by examiner

SYNCHRONIZED PULSES IDENTIFY AND LOCATE TARGETS RAPIDLY

PARENT CASE TEXT

The present application contains subject matter related to subject matter in U.S. patent application Ser. No. 15832,565, filed Nov. 29, 2017, now issued as U.S. Pat. No. 10,769,447, titled "Synchronous Convergent Pulses Reduce Dimensions of Serial Surfaces", which claims priority under 35 U.S.C. Sec. 119(e) to U.S. Provisional Application No. 62/497,726, filed Dec. 1, 2016, which are hereby incorporated by reference in their entirety.

DESCRIPTION

Field of Invention

Neural Networks, Optical Flow, Pattern Recognition, Distributed Computation, Feedback, Variable Frequency Oscillator (VFO), Nano-sensors, Phase-Locked Loop (PLL), Parallel Processing, Optical Character Recognition (OCR), Deep Learning, Memory Lookup, Robot Grasp, Anticipatory Synchronization.

Background of Invention

Information theory formalizes methods to parse an image into binary bits for coding and transmittal between locations. However, this can require sophisticated algorithms to encode, decode, and store the data over time. For example, target identification and acquisition typically requires algorithms that calculate and predict a future target location from successive integration of temporally coded information that reconstructs image frames. Prior art also requires 2D target coordinates to be coded and transmitted to a central processor to calculate the current position of sensors with respect to an identified target. In contrast, here the match of target features with matching topographical patterns of stimulated sensors to convergent nodes selectively identifies and locates a target at the same time with generic pulses. The initial steps of selective reemission of pulses by successive spatially and temporally convergent nodes is prospectively faster, especially as a target nears, than repeated feedback of data streams that code image frames, to and from a central processor.

In human neurons, the rate of spikes generated by stimulation of a sensory retina, reduces serially at successive synaptic stages, from the retinal ganglion cells (RGCs) to the lateral geniculate nucleus (LGN) and in individual cells in subsequent areas such as V1 and in-ferotemporal (IT) cortex. This reduction in maintained spike firing rate, as neurons spatially converge sensory inputs from the periphery into cortical perceptual areas with increased numbers of cells within larger receptive field (RF) areas, has been found true for sensory systems in general. Some have interpreted this reduced neural spike rate, due to spatial and temporal summation at serially convergent synapses, as multiplexed data, in a hypo-thetical temporal or latency code in neurons, analogous to the transmittal of coded data in wires. Others have presumed that the repetitive information in an image is encoded and decoded to reconstruct the image from compressed or sparse information. In an effort to copy the nervous system's economy of information transfer, neuromorphic chips condense binary coded information into packets that are time-multiplexed, with each packet time- and origin-stamped and addressed to specialized processing units. This avoids the congestion of information at a central processing unit, known as the von Neumann bottleneck, analogous to retinal convergence, in which the fibers from primate receptors spatially converge on RGC neurons in an approximate 60:1 ratio, before fanning out in an approximate 1:350 ratio of RGC neurons to V1 neurons. The apparent analogies between neural and computational systems are used in other models to code, transmit and decode still images from a sensor surface to a location that performs programmed cognitive functions upon the information in the image frame. An advanced nervous system is conventionally interpreted to take 'snapshots' of visual images with each shift of the retinal surface during fixational eye movements (FEMs), but these images to be stored in memory, have to be sparsely coded to conform with presumed anatomical and actual electronic coding limitations. These previous interpretations are only a partial use of the neurophysiological evidence and inevita-bly conmingle information theory with experimental data in a way that creates more con-founded complexity. Massive experimental data supports neural spike synchrony as a mechanism that couples perceptual processing of sensory input and communication between cortical locations. Recent analysis in reputable labs shows that little information is transmitted or communicated between neural locations in the synchronized or phase-locked state. Embodiments in this invention use rapid reemission of pulses from temporally synchronous inputs stimulated by connected feature patterns that thereby also rapidly synchronize proximal-distal serial nodes connected in serial arrays, as an alternative to the delays of temporally coded information repetitively transmitted between locations, to identify and locate a target in space with reference to a sensor array.

One prospective embodiment would improve stereo vision goggles used in virtual and augmented reality, which synthesize binocular stereo imagery from algorithms that compute the information in monocularly changing imagery transmitted in temporally coded streams, which due to slight asynchronies of image timing creates dizziness and vertigo in the wearer after a short time. This and other embodiments described in this patent, use the reduced summation times at serially convergent nodes of temporally synchronized pulses, rather than algorithms and reiterative feedback that calculate current target loci in binocular 3D space, to increase serial precision of synchronized emitted and reemitted pulses. Other embodiments here use monocular or binocular optical flow increases in proximal-distal motion parallax (looming), which by rapidly reemitting 1D pulse outputs, thereby avoid colli-sions with concurrently identified and unidentified targets as they near sensors.

Also based on temporally coded images, conventional machine or deep learning algorithms repeatedly cycle, or back propagate, streams of image information, comparing false posi-tives with previously learned image templates, which incrementally stream temporally coded information to probabilistically quantitate an output from paired alternatives. This repetitive feedback takes substantial time and computational resources. The invention here does not alter the digital connectivity of modular circuitry in neural networks by repetitive learning with different target templates, but compares maximal least-time pulse responses of multiple target stimuli, at a selective layer of many terminal nodes (FIG. 1). Neural networks in this invention do not temporally code 2D information in streamed 1D data, but temporally synchronous pulses increase the speed and intensity of convergent 1D pulses from topographically selective serial circuits, without the delay required to train circuits with similar targets in repetitive learning trials.

Overview

A comprehensive treatment of the ideas, logic and evidence underlying embodiments of this invention is in the book Synchronous Neural Time (2018), by the inventor, available on the internet. In the invention described here, pulses (analogous to spikes in neurons) transduce the detail of edge-stimulated 2D image information, which impedance matches at a synchronization frequency, aligned and connected nodes (analogous to synapses in the brain) in serial surfaces, layers or arrays (these terms are synonymous here). Therefore no x-y information is temporally encoded or multiplexed, by pulses to a distal location to be read out or decoded, but pulses constitute an impedance matching 1D z dimension that integrates convergent nodes in serially aligned 2D arrays via the frequency or rate of pulses emitted at an initial sensory array. In this invention, packets of information or spikes, are replaced by pulses in electrical circuits, which integrate, via the spatially and temporally integrative dimension z, proportional increases in both location and time at serial nodes.

A z pulse is defined here as equivalent to a single spike or a group of rapidly repeated spikes that are limited, or phasic, in duration. Pulses move when stimulated at a fixed time by a specific stimulus, such as an image 2D edge shape at a feature-selective 2D sensor pattern, or a moving edge at a sensor, corresponding to an 'event' detector. A condition of the existence of the z pulse is that it is not stationary, or a store of static information, but travels at a relatively constant speed, near the speed of light or of electrons over the wired, linked or connected (used interchangeably here) distance between serial nodes, organized orthogonally as serial 2D arrays. A node here is hardwired or programmed as a coincidence detector, reemitting a pulse only when its input or most or all of its multiple inputs spatially and temporally synchronize, reemitting a pulse within a specified window of time. Similar to resonant microwave or acoustic cavities, z pulses make use of repetitive, serial 2D surfaces that reiterate the initial stimulated sensory surface; at any instant, these moving z pulses are at a proportional distance and time as they traverse each serial array. If sustained pulses are at a sufficient speed and have a minimal temporal interval between any serial pulses equivalent to the distance between nodes in encompassed 2D arrays, the synchronization of any specified proximal-distal arrays at the pulse frequency occurs with little or no phase lag. As shown in rapid synchronization experiments, this phase lock occurs much faster than the transmission delay of a single spike between two neural locations, so requires at least two moving pulses as a synchronizing context. Here the interac-tion of 1D z pulses at serially convergent 2D arrays that summate from temporally synchronous z pulse inputs, creates a 2D x-y synchronization context that facilitates rapid synchronization of reemitted 1D z pulses. The repetitive generation of parallel z pulses by FEMs initially, causes a temporally synchronized (or resonant) frequency over the z distance between any specified 2D aligned and convergent nodes in serial arrays (FIGS. 1, 2B).

1D z pulses act as a transiently repetitive third dimension, so in the present invention do not temporally code or multiplex information in any binary or other coding scheme used for streaming temporally coded data. This mobile z dimension, constituted of pulses at a specific rate or frequency, integrates linked nodes regularly spaced in repeated 2D surfaces as a periodically stable 3D structure during synchronization. If at a sustained rate from the same x-y synchronous edge pattern, the pulses are in effect, identical in time and information content, even though each individual pulse is sequentially generated, due to the emergent context of z pulses repeatedly present at linked nodes at the same transient repeated times in orthogonal, repeated 2D arrays. The identical time and information content of temporally synchronized pulses with the same distance/time (or distance/latency) ratio, even though sequentially distributed along a z axis, not only are necessary for rapid or 'anticipatory synchronization', but bind perceptual and neural temporal synchrony mediated by FEMs that input successive 2D windows of synchronized time from external photon emissions (FIG. 4B).

In this invention, the time required for pulses to synchronize proximal-distal 2D arrays is not dependent on the quantity of information at the 2D sensor array that could be encoded and transmitted as bits in connected wires as in conventional systems, but depends instead on the gating frequency that synchronizes the periodic emission of pulses from the edge-responsive sensors of the initial 2D sensory surface. Generally, the synchronous emitted times of gated z pulses that spatially converge at nodes in any 2D surface reemits pulses at a frequency that synchronizes with the distance, latency and speed to the next 2D surface. Because the synchronized 1D z pulses at any distal location are a result of specific edges at specific x-y sensor locations, pulses that distally reemit, while not multiplexing temporally coded sensor data, are the displaced, temporally synchronized z locations of edges during, in organismal vision systems, the fixation period that encompasses multiple FEMs, or cycles, of the sensor array gating frequency. During synchronization of serial 1D pulses at 2D array nodes, emitted fixed times of moving 1D pulses adjust to coincide with sequential 2D synchronized time at each fixed 2D array, to enable pulse synchronization on 1D z axes. This relativity of fixed times of moving pulses and moving sequence of times at fixed array locations creates a context in which fixed pulse times that change location are convertible (or synchronize) with moving, sequential time at each fixed array location. During any specific FEM, due to photon impingement on retinal 2D arrays at a synchronized time from all external distances, sequential 1D z spikes are emitted in orthogonal synchrony from sensory 2D arrays that rapidly create a z synchrony of multiple pulses (or spikes) even though differences exist in the variable latencies of photon origins. These differences, at any synchronized 2D gated instant of time due to FEMs, enable a context of connected 3D space in each sequential percept that accrue as the perceptual moment.

Corresponding to the coordination between the minimal fixation period and the temporal length of the perceptual moment in physiological vision (both measures approximate 150 msec in humans), sustained sensor z pulses elicited by spatially simultaneous 2D letter or feature edge patterns, travel from the sensor surface to synchronize with latent perceptual pulses at distal nodes. To match the stimulated photon inputs during the perceptual moment with a cortical perception in humans temporally, the sequentially reemitted 1D z pulses impedance match, via synchronization that dissolves latency and distance differences of inputs, each 2D array's reemission of convergent z pulses. In psychophysical and physiological experiments, a stimulus of just a few msec is distinguishable perceptually as an emitted time, because in addition to a sustained train of spikes during the perceptual moment, phasic spikes of short burst duration mark the initial stimulation event elicited from specialized On RGCs. In a neural network as envisioned here, phasic and sustained pulses spatially and temporally synchronize on convergent nodes in arrays, to reemit 1D z pulses during each gated frequency cycle. But the detailed sensory information that is synchronized during the shifting or gating frequency of the sensor array, is not transmitted as a 1D data stream, so is not defined or limited by bandwidth or bit rate during the synchronized state. 1D z pulses sustained at a gating frequency by a stationary or moving edge pattern, emit at a rate with approximately the same spatial interval as the temporal interval of z pulses emitted and distributed proximally-distally for a synchronized duration of time. In embodiments here, the synchronous times of the multiple z 1D pulses at the resonant gating frequency, do not require proximal sensory information or target reference coordinates, to be decoded or reconstructed as an image frame or with specific target reference locations, at a distal CPU.

The gating frequency of the 2D sensor array emits x-y synchronized z pulses, at temporal intervals that coincide with wavelengths and frequencies corresponding to distances and latencies between serial 2D surfaces. If there are no stimulated edge crossings in any shift-cycle of the sensor array, no synchronized z pulses emit for that cycle. However a detailed, complex image emits many temporally simultaneous z pulses in any cycle of the gating frequency; it is possible to modify somewhat the gating frequency in response to stimulus intensity to increase precision, or to modify the amplitude of each cycle to alter the sensor response to edge contrast. Microwave design theory provides a basis that impedance matches the distance between 2D cross-sectional surfaces with the inversely proportional frequency generated between the surfaces. Here, distance between specific linked nodes arranged in regular 2D arrays, not information density, bit rate or bandwidth capacity, governs the z frequency over that linked distance. Amplitude or frequency modulation, or phase differences of similar frequencies, which in prior art are used to code and transmit information, are not used here because edge emitted-times impedance match event detection at the periodic gating frequency of the sensory array with each displaced z location of pulses. While information theory has created data that result in better understanding of the brain, it should not be assumed the brain's sensory systems use the same methodology.

The initial conjunction of edge stimulation with orthogonal sensor array frequency synchronizes, or impedance matches, the periodic timing between edge-generated pulses and the proportional wavelength or latency to specific nodes in serially distant 2D arrays. Conventionally, PLLs correct via feedback of measured phase differences, the phase-locked frequency specific to the distance between two nodes. Here, the resonant frequency is inversely proportional to the distance or wavelength between connected nodes that reemit in phase from temporally synchronous inputs, so varies with the z latency between the specific connected nodes. A coincidence detector, or convergent node here, responds by reemitting to temporally synchronized inputs, from equidistant or equally latent input nodes, in which the synchronization interval is defined by the periodic frequency of emitted z pulses that synchronize the specific linked or connected nodal distances. What are conventionally measured in neurophysiology at an electrode location as phase differences, which are ag-gregated to obtain an average spike frequency, are here, specific phase-locked frequencies tuned to specific z distances between specific nodes.

The periodic synchrony of moving z pulses is an intrinsic feedback mechanism that impedance matches the repeated emitted time of sustained pulses at a gating frequency with times of substantially identical generic pulses latently reemitted from connected nodes in serial 2D surfaces. The orthogonal sensor surface makes the variable unit distance locations (at varied focal lengths) of normally impinging photons simultaneous in time at each synchronized instant of z time caused by each gated shift (that emits zero-crossing x-y edge events) of 2D surface sensors. Each cycle of a gating frequency (corresponding to a FEM) generates a cycle of a z axis frequency, measured by single pulse or a short burst of pulses from initial convergent nodes, which, also measured as pulse rate, transform synchronous convergent inputs at x-y arrays to serially emitted 1D z times that synchronize repeatedly at downstream serial 2D arrays (FIG. 2B). Synchrony can also result from conventional recurrent feedback of convergent pulses emitted from a serial 2D surface to nodes in a previous surface. Proximal-distal integration of 2D serial surfaces by synchronized 1D z pulses requires a change of mindset from information transfer in a temporal code of binary master-clocked pulses to one of impedance matching, or synchronization of serial 2D arrays, by a normal projection of repeated 1D z pulses. This requirement for a moving z time dimension, which transiently and repeatedly integrates connected nodes in repeated 2D surfaces when temporally synchronized, does not violate any physical laws.

The prior embryonic development and definition of specific anatomical routes are very important for the specialized stages of visual function, as shown by the neural convergence and divergence to the various quantities of neurons, or nodes, specific to each serial convergence at orthogonal arrays of the RGC, LGN, V1, V2, . . . stages of the visual system. Binocular fusion, robotic reaching, size constancy for object identification, location constancy (circuit convergence from any part of the visual field to a serial node's large RF), proximal-distal optical flow for space constancy, sensed from relative motion parallax of objects at serial convergent nodes in serial arrays, and locating targets without 2D or 3D reference coordinates relative to a sensor array, as well as hippocampal memory lookup, use variants of neural circuitry that serially converge and diverge to repeated arrays of 2D nodes (FIGS. 1, 2C, 2D).

Brief Summary of Invention

In one aspect of the invention, repeated, serially aligned 2D surfaces dimensionally reduce to a single periodic structure, enabled by a third dimension of z pulses moving in wired or connected links between the serial nodes. Reemitted pulses are timed in periodic temporal intervals that transiently position the moving pulses at serially linked nodes in serial 2D surfaces at the same synchronous time (FIGS. 2A, 2B). While it seems inefficient to time pulses at intervals or latencies from nodes in an array to aligned and convergent nodes in another serial array, rather than transmitting at a high bit rate, it is more efficient if a proximal image is not reconstituted distally with 2D information streamed as 1D data. An advantage of this aspect is that image frames are dimensionally reduced via 1D z emitted pulse times at initial nodes; 2D image information or reference target coordinates, are not required to be encoded proximally or distally decoded. This coordination of synchronous planar 2D x-y time with sequential 1D z time creates in-cremental spatial and temporal precision not apparent if the presence of the same edge is averaged over time (FIG. 6).

In another aspect of the invention, the emitted time of pulse stimulation is retained by the proportional distance/latency of the moving z pulse at any elapsed time after stimulation. The survival, or micro-memory, of any z pulse over time and distance requires that latency accrues, without a tag or code, to the emitted time of any z pulses that rapidly reemit at serial nodes; this periodic reemission also synchronizes z pulses proximally-distally (FIGS. 4A, 4B). The temporal synchronization of pulses proximally-distally retains the pulse emission time (FIG. 3A), by the proportional change in location of this fixed time when temporal synchronization rapidly reemits at convergent nodes at proportional distances. By moving at the same speed as similar pulses from a proximal surface, at a synchronized frequency or pulse rate, the sequential position and latency of the pulse in relation to the reemitted train of pulses is maintained. The retention of emission time in moving pulses is important in physiological vision; specialized phasic On-RGCs emit a train of spikes of short duration, specifically stimulated by the short passage of a stimulus edge at a receptor edge. In experiments, the spike response to externally moved stimulus edges and to internal physiologically generated FEMs is recorded with the same intensity and duration, meaning that observer imposed reference coordinates do not distinguish internal self from external non-self stimulus movement to orient physiological target acquisition mechanisms.

The repeated coordination between sequential 1D z pulses and serial orthogonal 2D layers of convergent nodes that only reemit from temporally synchronized inputs, rapidly synchronizes emitted times and moving pulse locations at frequencies and wavelengths matched with distances between stationary nodes at repeated cycles of FEM emission times. This impedance matching synchronization is an intrinsic feedback mechanism that combines static times of emitting and reemitting pulses at static nodes, at which time moves sequentially. Because physiologically, orthogonally synchronized spikes emitted by a 2D RGC array with each cycle of FEMs constitute human conscious neural experience at any single instant of synchronized proximal-distal neural time, external physical reality is experienced as connected 3D space.

In a third aspect of the invention, the match of moving 1D pulse locations with static serial orthogonal 2D locations is important for degrees of optical flow detected by the observer at any increment of measured time and sequentially over time. Optical flow is measured by the relative dx/dt and/or dy/dt speed, of parallax motion (at varied spatial distances or varied focal lengths) with reference to a perceptually stable background, in which increased relative motion, along with the looming size of stimulus features that substantially match topographical sensor patterns, increase emitted pulse rates, with concomitant reduced spatial and temporal summation time at convergent nodes, and therefore increased speed and intensity of reemitted latent pulse perceptions. In physiological nervous systems, spike rate increases with larger size, increased speed and closer distance (or looming size) of the stimulus. The more rapid reemission of pulses by feature and edge 2D patterns that substantially match sensor topographies and serially convergent nodes of varied topographical complexity, is computationally faster than the decoding and comparison of serial image frames at a central processor from temporally coded streams of spatial information.

Repetitive z pulses at sequential nodes in serial 2D arrays, as well as speed of pulses, use the same dz/dt notation here, in which dz/dt=a constant, is both a constant speed and a proportionally constant distance/latency ratio, of topographically aligned serial x-y locations along a z axis. Therefore, the conversion of distance to time and vice-versa, is enabled by an impedance match of dual constant ratios. Photons from various distal locations in external physical space impinge on an x-y sensor surface in each cycle of a gating FEM; in other words, differences in optical flow in 3D external space are comparatively sensed in each synchronized instant of time of the 2D sensor array in each fixational 'snapshot'. These differing optical flow speeds on an orthogonal sensor array are measurably not the same, but are perceived in the same 2D gated cycle of x-y time; continuously reemitted, synchronized 1D z frequencies impedance match external distal and proximal differences in 3D target distance, origin in time and varying optical flow.

In a fourth aspect of the invention, the z dimension, emitted as pulses in response to a feature-specific topographical sensor pattern, changes location a proportional 1D z distance according to a gating frequency or pulse rate, generated at a sensor 2D x-y array. A slower pulse frequency stimulates a more distal node because the longer distance requires a longer wavelength, or latency, for temporally synchronous pulses to summate at the distal node. The distal node may recurrently reemit pulses as feedback on a previous emitting node to temporally synchronize emission with reemission pulse timing intervals, or to synchronize the static pulse emission time with the elapsed latency that results from pulse speeds and summation time delays between resonating serially linked nodes.

The gated emission and reemission frequencies from patterns of feature-selective sensors and nodes generate the temporally synchronized pulses that move the z dimension to terminal nodes, which selectively integrate 1D pulses emitted by combinations of stimulatory feature patterns. Initially generated pulses from feature edges rapidly reemit from temporally and spatially convergent 1D z pulses, these rapidly reemitted pulses recognize the feature by the concomitant higher pulse rates passed by serially selective nodes. Z pulses sustained proximally-distally, allow the z location and timing of the proximal stimulus to transiently but repeatedly synchronize distally, without temporally coding detailed x-y information that would otherwise in other art stream as data to reconstruct sequential image frames. The increased reemitted pulse rate, due to a substantial match between a feature pattern and a stimulated pattern of nodes, is a measure of not only more rapid recognition, but greater accuracy and precision of recognition, which is directly due to faster summation by more pulses at serially convergent nodes. Increased quantities of pulses are due also to looming size and/or faster parallax speed due to increased optic flow, indicating that a higher distal reemitted rate of pulses is faster recognition of relevant feature patterns. In addition, because the many terminal nodes can individually respond to many types of 2D feature patterns by topographical groups of serial nodes, these different perceptions in the same distal convergent array of differentiating nodes are compared with previously standardized 1D responses to feature patterns, rather than by temporally coded sequential de-cisions for/against a specific feature pattern learned over many trials (FIG. 1).

In a fifth aspect of this invention, the synchronization of emitted z pulse 1D times, moving at dz/dt speed across proportional locations/times in serially hardwired 2D x-y arrays, matches moving z pulses with specific proportional locations/times, in which a topographically stable (hardwired) serial 2D location and associated latency impedance matches a moving, changing latency of each z emitted time. In memory lookup, pulse speed, dz/dt, synchronizes a 1D z pulse fixed emitted time with a stationary location and latency (resonant frequency) of a node in a 2D array, as a dual moving z and stationary x-y spatial and temporal match of distance/latency. Because pulse speed, pulse emitted time, and proportional frequency and latency at a node all transiently synchronize, time and space (frequency and wavelength) at any node are relativistically interconvertible. This relativistic re-lationship is expressed as a constant that impedance matches human perception of 3D space at 2D arrays with serially reemitted proximal-distal 1D spikes, and theoretically facili-tate memory lookup in 2D mapped locations.

In a sixth aspect, a dz/dt constant pulse speed on any 1D z axis, in which the constant dz/dt ratio coincides with proportional (constant ratio) distant/latent serially matched 2D node locations, indicates a dimensionally reduced impedance match of moving 1D z pulses with static serially matched 2D x-y nodes. A constant pulse speed dz/dt and a proportionally constant serial dz/dt ratio synchronize, via orthogonal serial 2D arrays that reemit 1D pulses from temporally synchronized pulse inputs. The concept of rapid or 'anticipatory' synchronization in this aspect, requires this impedance match of speeding 1D dz/dt emitted pulse locations and stationary, serially aligned arrays composed of 2D orthogonal, temporally synchronized reemitting nodes. The larger time units at longer, more distal locations in physical space, expressed as a longer wavelength and lower frequency, create a sense of spatial stability that coincides with slow distal optical flow; this perspective stability also does not require a target to reemit 2D reference coordinates in a temporally coded data stream to enable continuous space constancy.

In a preferred embodiment for a reading apparatus, feature selective nodes respond to specific 2D spatial patterns of inputs, corresponding to letters or characters, which converge upon an equidistant node within a limited temporal window, to reemit a z pulse or burst of pulses, in response to the specific word signaled by the letters. This occurs in repeated stages of spatial convergence, with succeeding reduced pulse frequencies, until a terminal node reemits z pulses that temporally synchronize, during the total perceptual moment, with pulses sustained by the proximal spatial information. The z pulse rate at the terminal node is too low to convey the peripheral spatial sentence information. The rapid shifting of proximal information during reading does not require specific responses by specific distal nodes to specific letters and words; generic categorization responses that converge in least-time to specific terminal nodes synchronize with specific stimulatory letters as they change during repeated reading fixations. Pulses gated by a repetitive orthogonal sensor array frequency, in which proximal sensors are specifically responsive to rapidly changing letter information, synchronize at distal nodes with local clusters of nodes responding in least-time to convergent 1D z pulses, which enables recognition, inference and abstract meaning to emerge from the shifting proximal letter pattern.

The above described embodiment is only one of many possible for recognition of any spatial pattern. Other embodiments relevant to repetitive cycles of generic 1D z pulses without the encoding or transfer of bits of 2D information are described in the detailed description of this invention but are not limited to the examples given.

A preferred embodiment for a categorization and identification device of stimulus targets or shapes, uses the synchronous emission and reemission of pulses to synchronize proximal stimulus specificity with a latent distal categorization, based on a convergent path of stimulus edge-generated pulses that converges most rapidly on specific terminal nodes, among many possible (FIGS. 2A, 2B, 2C, 2D). This least-time path through selectively serial nodes does not require the cyclic repetition of feedback information between nodes in repeated layers or arrays to learn the identity of the peripheral stimulus feature pattern over time, but does require previously standardized reemitted pulse 1D responses at differentially responsive terminal nodes to previous exemplars. The association of the pulses emitted by a specific edge-pattern with distal recognition or identification, by least-time pulses reemitted to specific terminal nodes, is shown by analyzing time, embodied in moving pulses, into emitted, latent, synchronous and sequential contexts on the same 2D plot (FIG. 4). These intrinsic time properties do not code, transmit and decode information that reconstitutes a stimulus representation at a distal location, or repeatedly cycle temporally coded data streams for algorithmic analysis of stimulus pattern information.

Another embodiment provides for synchronous coordination of a robot hand reaching toward and grasping a target (FIGS. 6, 7). The analysis of time into components is a part of this invention that eases the comprehension and display of increased precision and reduced latency of maximal response near the target, which does not require looping delays of informational feedback, but is due to feature edge patterns that substantially match with sensor patterns, with concomitant faster pulse reemission rates. This is an advantage over the technology that becomes less precise due to information feedback delays that are larger than pulse reemitted speed and rate of optic flow near targets as sensor arrays near looming targets.

A last embodiment uses the fastest reemitted pulses traversing proximal-distal array convergent nodes for differential identification and recognition of a stimulus target by the most selective nodes in the last array. Only sustained slower spikes from the target object synchronize proximal target 2D reference loci with distally convergent 1D perceptions and feature recognition (FIGS. 1, 2). The largest quantities of pulses emitted and reemitted most rapidly during shorter windows of time to specific terminal nodes, differentially identifies targets, so does not require 2D location information to match with templates in memory. Because the identification of a target in this embodiment does not require repetitive learning from many exemplars that modify layers of nodal circuitry, but a standardized modular circuitry that responds to previously defined exemplars to reemit repeatable, least-time 1D responses comparatively differentiated at specific terminal nodes, learned biases that accrue can be avoided. As described here, 2D/3D reference locations of a target are retained by the operational connection of sustained sensor array pulses that synchronize with distal selective recognition/identification by nodes with least-time pulse responses (FIG. 7).

DETAILED DESCRIPTION OF THE INVENTION

Theory of Synchronization Based on Brain Mechanisms

Figure 6:
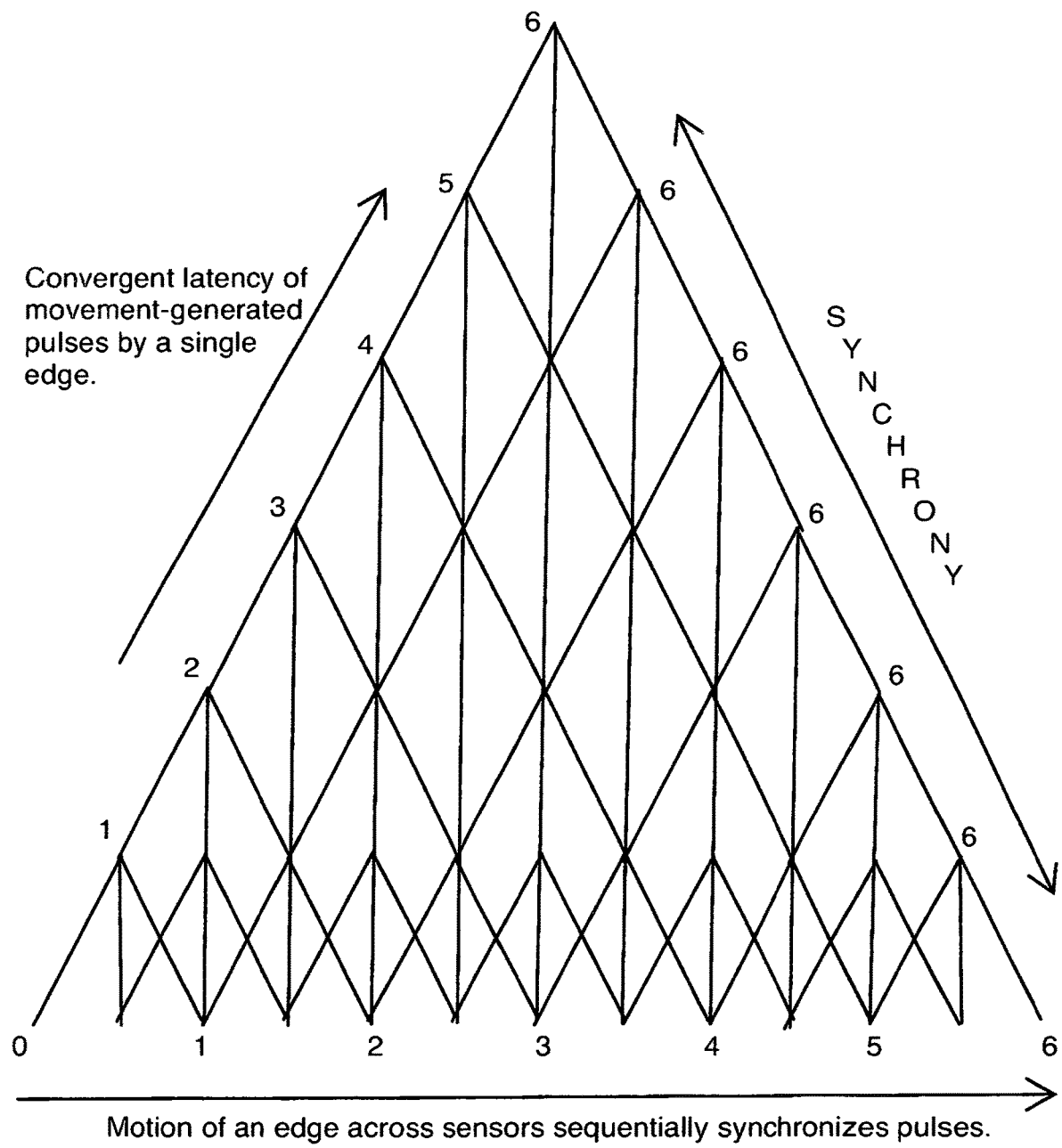
FIG. 6) A moving target edge progressively synchronizes pulses from a sensor array, which also synchronizes temporal and spatial precision at sensors with a distal node response to the target edge.

Embodiments of the present invention are now described in more detail; in concert with the figures, they enable those skilled in the art to execute the invention. The descriptions of convergent circuits that follow, take advantage of the synchronous timing characteristics of emitted pulses, caused by the repetitive cycling of an initial 2D x-y surface consisting of repeated sensors, pixels or other types or forms of sensory or edge detection. Gated pulses stimulated by stimulus feature edges and emitted by edge detector sensors, are controlled by the orthogonal shifting of said surface, or of a shifting screen over a non-shifting 2D surface, or of a fixed transmittal rate (in Hz) of a CCD array or CMOS chip, or any other sensor assembly, or of a frame rate or exposure time in a camera, at an amplitude sufficient to elicit edge responses from individual sensors or pixels in an array. Any edge-stimulated patterns of pulses converge via linked serial topographies (65 and 80 in FIG. 1) of nodes that individually respond to spatial and temporal convergence of pulses emitted by pattern features or characters (FIG. 2D), or the movement of target edges across sensors (FIG. 6). The shape- or object-specific 2D pattern of linked edge-generated pulses (70 and 85), coupled with the orthogonal frequency that synchronizes the z pulse emission times in gated cycles, temporally and spatially converge pulses at serial feature-selective nodes (86, 87, 88), culminating at differentially responsive nodes in the last array (100) in which the high-est magnitude and thus least-time pulses pass preferentially through serial convergent arrays 110, 120, 130, 140). Because of the serial increase in filtering selectivity of convergent nodes in serial arrays to impinging temporally synchronous pulses, pulse outputs reemit most rapidly in convergent 1D z axes, routing to very selective nodes in the last array (89). This least-time routing does not require any temporal code, latency code, or incre-mental adjustment of synaptic weights to bias pulses onto a specific path over many trials. But the 1D z pulses that converge most rapidly to specific nodes in the last array (150) due to an adjusted parameter (420 in FIG. 2D), survive to give a latent recognition of the fastest pulses emitted by a stimulus pattern at its x-y sensor array locations (100). The 2D information of variable stimulus size, location and orientation at a sensor array (100, 170) is serially filtered out (181) by reemitted 1D z pulses.

Figure 1:
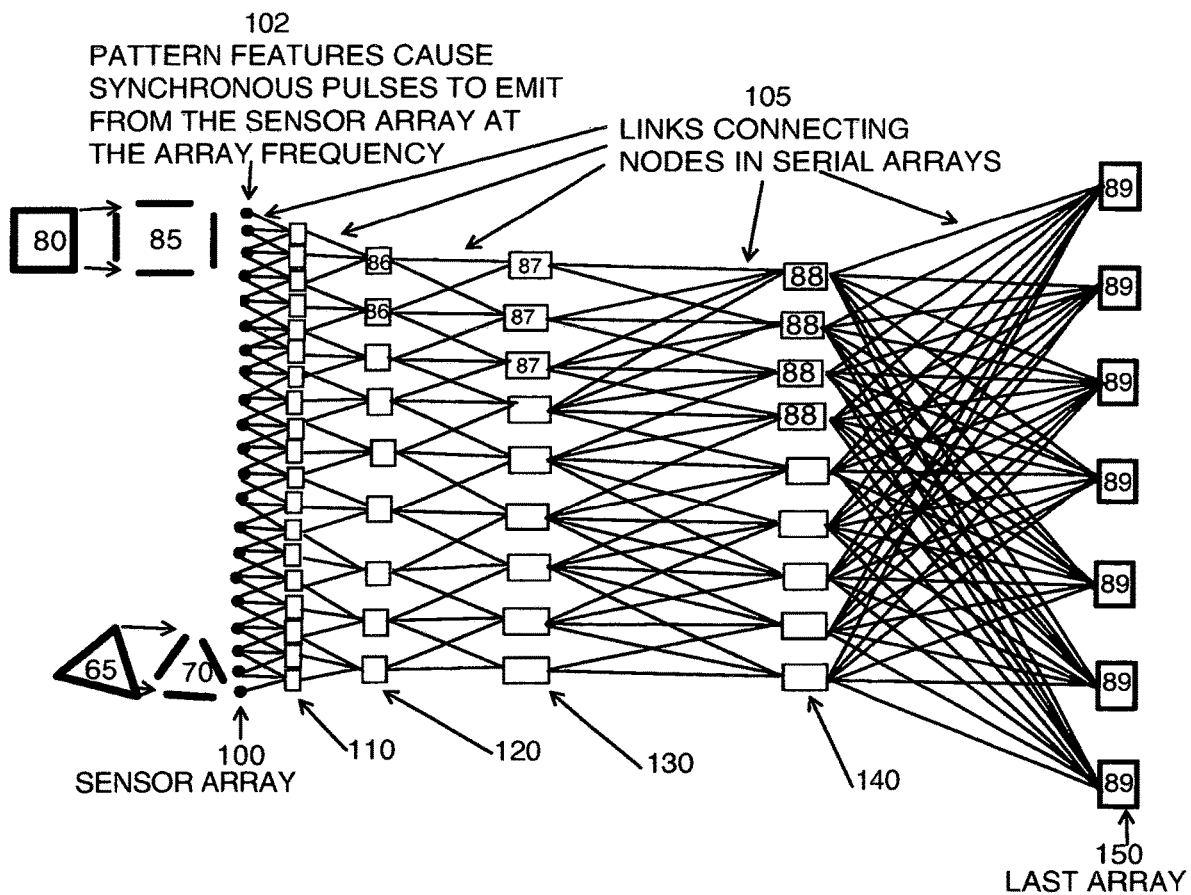
FIG. 1) This version of a neural net composed of nodes in serial arrays, selectively propa-gates pulses that temporally synchronize at nodes. Specific nodes respond fastest to convergence/divergence filtered by temporal and spatial pulse synchrony at serial nodes, from any multidimensional stimulus location. Serially reemitted 1D pulses from the most strongly matched stimulus features and 2D node patterns, filters to a few feature responsive nodes of many nodes in the last serial array.
Figure 2A:
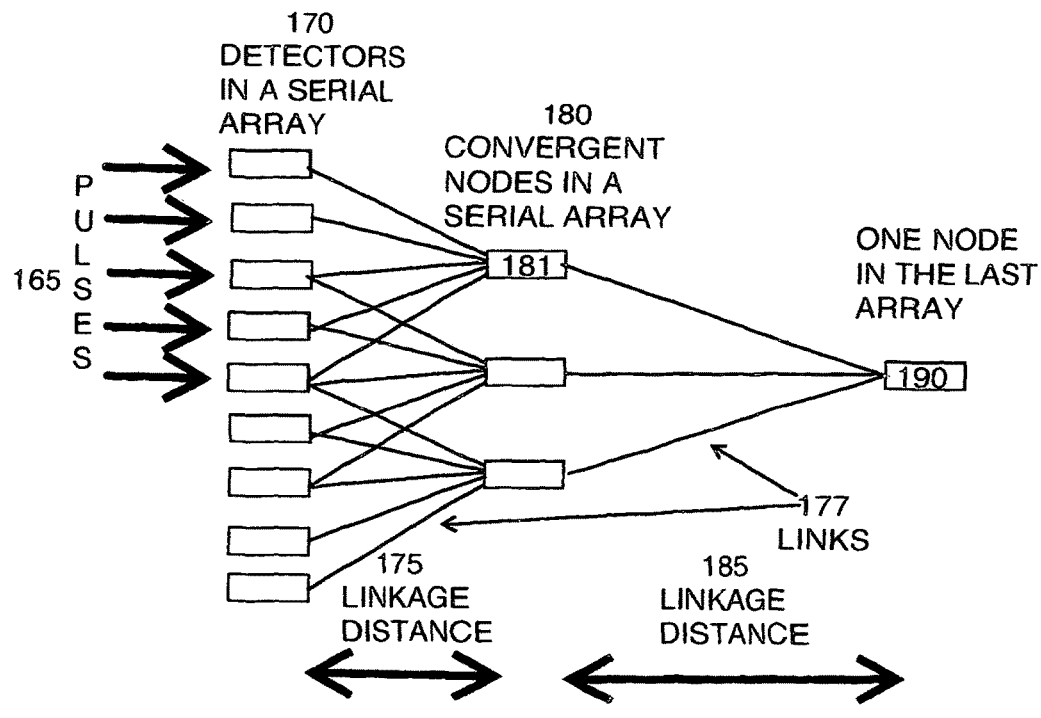
FIG. 2A) Synchrony exists if reemitted pulses are concurrent with newly emitted pulses from the same feature pattern. 1D z pulses that rapidly reemit at serial nodes synchronize at frequencies (or harmonics thereof) and wavelengths that approximate the distance between two given nodes.
Figure 2B:
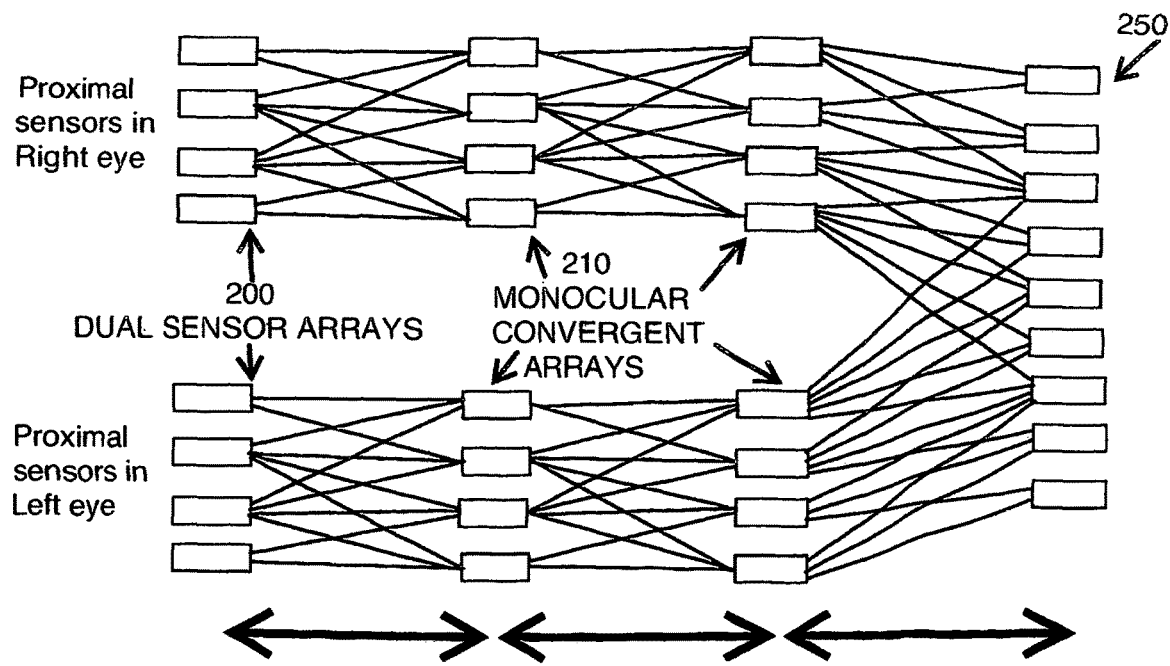
FIG. 2B) Temporally synchronous monocular pulses emitted by the same dually mapped edges of a feature pattern, reemit from binocularly convergent nodes at a frequency and wavelength approximating the distance and latency between serial arrays, for sharp 3D depth resolution.

With conventional technology, 2D edge information is transduced by sensors and encoded as bits. Here, while sensor topography selects for feature orientation, or sensor types select for light wavelength, haptic, ultrasound, microwave or other stimulation, the z pulses within the convergent sensory field specific to a sensor type, do not themselves encode feature information, except that pulse intensity (increased pulse numbers in the same latency and summation time) is proportional to the intensity of stimulation by the feature pattern. An initial layer or array of coincidence detectors, or equivalent programmed or hard-wired components, reemits pulses over a relatively wide temporal window to accommodate differences in sensor latencies due to gray areas in the object and feature or pattern varia-tion. Partial stimulation of individual sensors by the filled area of the stimulus that affects latency, is also accommodated by this relatively wide synchronization window; but subsequent arrays of spatially convergent nodes accept pulses from narrower windows of temporally synchronized inputs. The specific edge-emitted times, conveyed by z pulses over the duration of stimulation by the gating frequency of the sensor surface, periodically synchronize in each serial stage of spatially convergent nodes or similar coincidence-detecting circuitry as previously stated. At each serial 2D surface, equidistant, equally-timed z pulses converge spatially at a few nodes in the array of nodes; if the pulses impinge on the nodes within the synchronization window, 1D z pulses reemit rapidly, temporally synchronized with the cycle of sustained outputs from a previous 2D surface (FIGS. 1, 2). Nearby convergent nodes in the same layer that are not equidistant from previously stimulated nodes, do not have equally timed, synchronized pulse inputs from a proximal stimulus feature pattern, so do not rapidly reemit pulses z-synchronized, or phase-locked, with orthogonal x-y inputs. The moving z pulse locations sustained from initial stimulation of the 2D sensor surface synchronize at the gating frequency: if synchronously emitted z pulses from the first layer of nodes or sensors have a total duration at the next reemitting layer of nodes that is approximately equal to the duration of one cycle in the gating frequency, reemission occurs (102, FIG. 4B). This gating frequency may be adjusted to the distance and summation time at a layer of nodes by VFOs, PLLs, FPGAs, ASICs or any synchronization detecting components integrated into the circuitry (FIGS. 2A, 2B, 420). Because the initial 2D surface may have a topography of overlying layers of different sensor types (330), convergence of inputs on subsequent nodes, from simultaneous stimulation of the 2D sensor surface at the imposed gating frequency (FIGS. 1, 2D, 4B) and/or slower drift across the sensor surface (FIG. 4A), allows a serial z synchrony to establish in parallel and convergent z axes, from the connected edges constituting an object feature pattern. A high shunt impedance between parallel x-y aligned z pulse pathways reduces blur and retains sensor resolution, while a low series impedance in z pathways between repeated topographically aligned arrays, allows pulse rates or frequencies at resonant wavelengths, to rapidly synchronize from temporal and spatial pulse coincidence at convergent nodes.

Figure 2C:
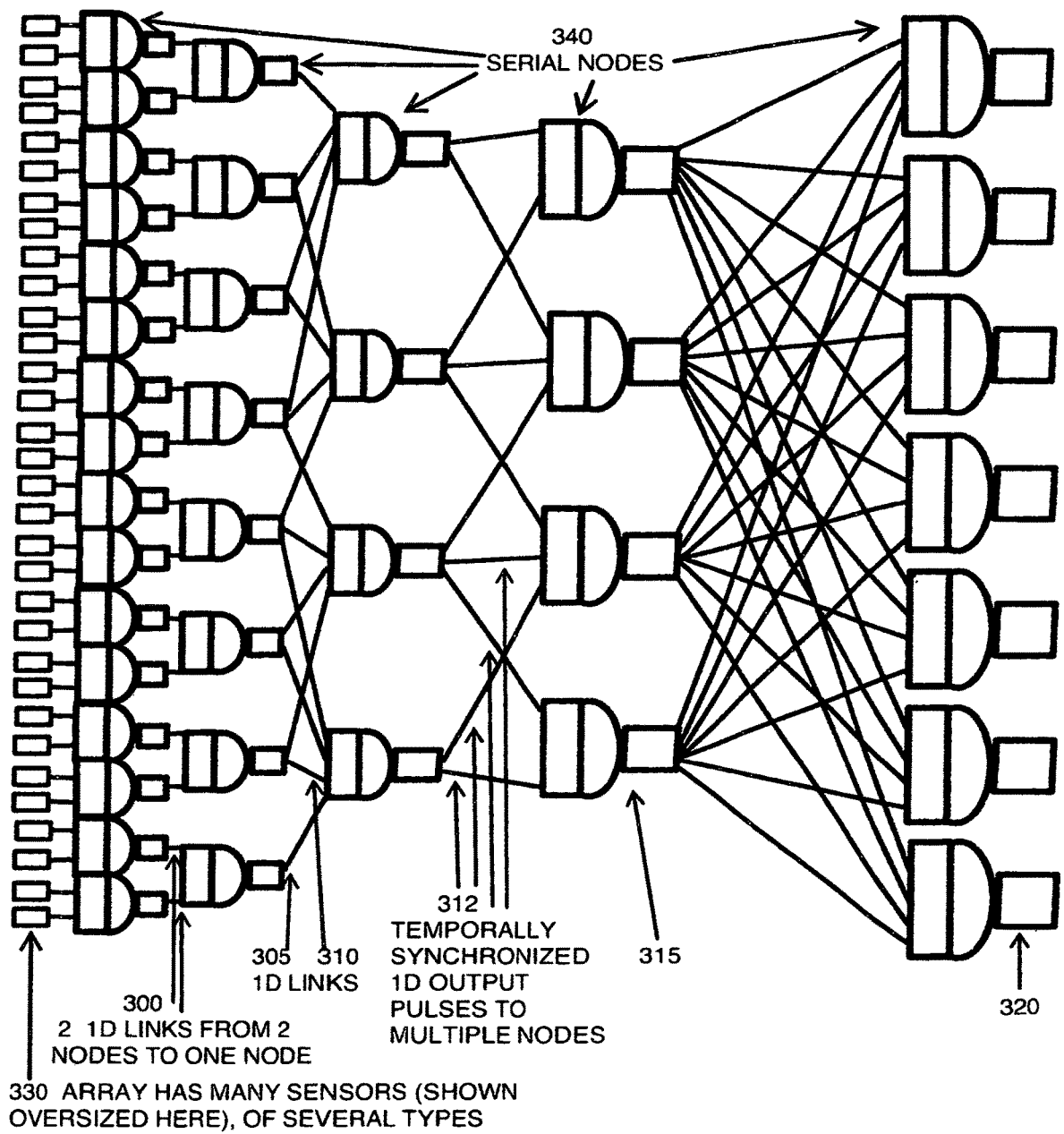
FIG. 2C) Edge patterns stimulate sensor types that converge outputs from specific edge orientations to initial nodes. The temporal synchrony of pulses emitted by a stimulus edge, or from an edge pattern, converge in multiple input links that summate at initial and subsequent nodes, which reemit serially selected 1D pulse outputs.

While the least-time response is due to convergent input patterns that match topography of early and intermediate nodes, it is also adjustable and configurable at an interface (420) to select output pulse rates and frequencies as shown in (340) that make up repeated cascades in serial arrays of nodes (FIG. 1, 2C). The specific stimulatory feature pattern (65, 80) sustains pulses that reemit at maximal rates by specific nodes in the last array (320), which respond fastest to temporally synchronous pulses reemitted through downstream serial arrays. The x-y locations of sustained pulses generated by the sustained presence of the feature-connected edges of a pattern at any 2D location (330), or a moving edge event at sequential sensor locations (FIG. 6), is temporally synchronous with pulses reemitted from the last array (320). Therefore, 1D z axis pulses (300, 305, 310, 312) that selectively propagate to converge at a few nodes in the last array (320) not only recognize stimulus targets by least-time/high magnitude pulses, but sustained pulses that summate more slowly also have longer intervals to accommodate the increased distance and latency to the selective last nodes (FIG. 2A), which sustained pulses are temporally synchronous with concurrent pulses emitted by sensors and initial nodes (330) by the specific stimulus feature patterns and moving events at any 2D location in the sensor array (FIGS. 2A, 2C, 2D, 6). This sustained temporal synchrony is not multiplexed information (FIG. 4A), but integrates proximal 2D variable information with distal identification of the target features, necessary for reaching to a specified target (FIG. 5).

The different sensor types that respond to specific object features take linked routes to nodes that respond to temporally synchronous inputs, in which specific spatially convergent circuits, or coincidence detectors, also respond to the topography of sensors stimulated by a feature pattern within a narrow window of time that is adjustable (420). This process is analogous in the brain, to the serially repeated anatomical convergences at synapses in V1, V2, V3, V4 layers, etc. that terminate at cell clusters in IT cortex (a simplified schema is shown by the network in FIG. 1). The synchronization at convergent nodes in the last array (150), of the fastest, least-time pulses emitted by the specific pattern of x-y pulses at the sensor surface (100), makes the stimulated location of the proximal array's sustained pulse pattern (100, 102) synchronous with pulses at distal spatially convergent nodes (FIGS. 1, 2C, 2D, 4B). Spatial and temporal resolution of features, and location and size of a specific x-y stimulus, are defined at the sensory 2D surface (100, 330) and the serial arrays that define 3D binocular resolution from monocularly emitted pulses (FIG. 2B). However, emitted stimulation time is a fixed micro-memory retained by proximal-distal pulses in continual movement to convergent nodes (FIGS. 3A, 4B) in serial arrays, which spatially and temporally synchronize (FIGS. 4A, 4B) proximally sustained pulses with reemitted fixed pulse times at distal nodes.

At distal nodes, including at least one node in the last array, a reduced frequency of z pulses does not decode or reconstruct the complex information in the proximal sensor image to make it identifiable, but is in phase with the complex information impedance-matched by the typically high pulse rate of sustained pulses emitted by the 2D feature pattern (100, 102). Here it is the spatially and temporally convergent z pulse rate or frequency at distal nodes (315, 320) that temporally synchronizes with pulses emitted at the sensor array frequency (102) by specific x-y patterns of inputs; this information is not encoded by phase or latency differences, which are in spikes that are in an averaged frequency typically recorded from physiological electrodes over many trials. Here distal z frequencies result from the feature-selective circuitry that directs z pulses, via least-time temporal and spatial convergence, to reemit synchronously from a distal node. The specific temporal and spatial inputs that cause reemission of z pulses, converge on nodes in the next array (86, 87, 88), which in turn, have a distributed, selected least-time reemitted response that inputs to the next layer of nodes. The simplified node circuit shown in FIG. 3B (many other versions are possible to those schooled in the art) can be multiplied in cascaded arrays of convergent nodes (FIGS. 1, 2C). The serially reemitted z output pulses do not transmit multiplexed information, but at convergent nodes reemit a single z dimension (with no multidimensional properties) in pulses temporally synchronized with the complex features, orientation, size and location of stimulation at proximal sensors. 1D z pulses here have no defined temporal code required to reconstitute a 2D stimulus, but move sequentially and repeatedly through any distal node that reemits from, and thus select, specific spatially linked and temporally synchronized pulse inputs (for a brain, this repeated latent reemission is perceived continuity). Moving distal z pulses can also recurrently stimulate, or feedback upon, the feature and temporally selective nodes in the previous 2D layer. The feature selective, spatially patterned links to convergent nodes have serial increases in RF area (FIG. 1) due to increasing numbers of linked input nodes (86, 87, 88, 340).

The proximal sensors that select various features converge with the same input type at ad-ditive nodes in initial 2D arrays (110, 120, 130, 180), but multiple convergences of sensor and node types may be necessary to selectively respond to multisensory RF patterns at convergent nodes in a last array (150). A few selective convergent nodes, of many nodes (89) with overlapping RFs in a last array (150, 190, 320), reemits 1D z pulses most rapidly and maximally from input pulses routed by spatial and temporally synchronized reemis-sions from repeated filtering components or circuits in serial 2D arrays (312, 315). The temporally synchronous pulses do not themselves temporally code shapes or feature patterns. Because the orthogonally distributed filtering circuit modules are specialized for each serial array, subject to the balance of selective parameters designed into the integrated circuitry, specific details, such as location, size and spatial resolution are not reconstituted from temporally coded, tagged or streamed information, but rather, least-time z pulses synchronize proximal x-y spatial and temporal information (102, 170, 330) with convergent 1D z pulse moving locations reemitted selectively by nodes in serial arrays including the last array (150, 190, 320). The serially reemitted convergent pulse dimension, z, eliminates the multidimensional complexity that is filtered by serially linked nodes in arrays (FIG. 3B), in favor of reemitted 1D z pulses that transiently synchronize linked nodes in downstream serial arrays.

Pattern Recognition by Synchronized Convergence without Learning Algorithms

Figure 2D:
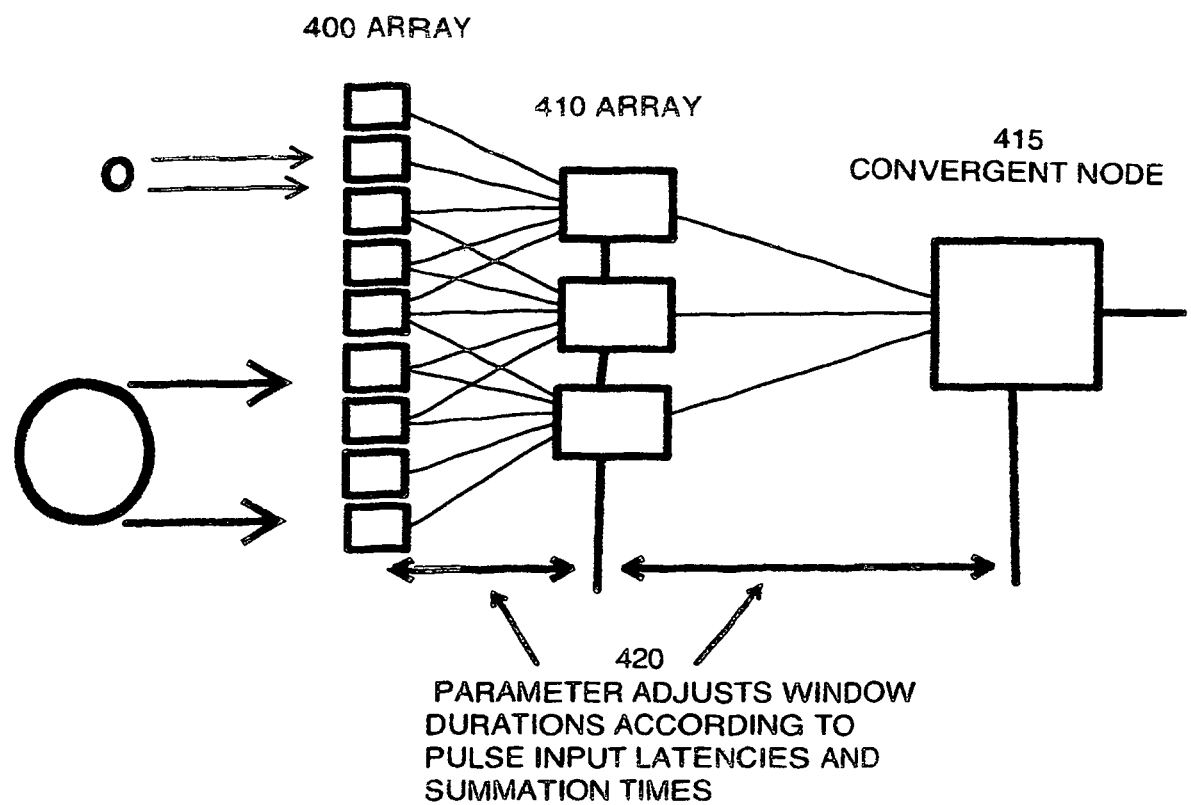
FIG. 2D) The 2D properties of the stimulus, such as its area, stimulus location in the sensor array and orientation, filter out in the serial 1D z outputs. The selective reemission of serial 1D z pulses is adjustable. The fastest pulses to nodes in the last array, which identifies or recognizes the stimulus target or its category, precede sustained pulses from the same target that emit and reemit from serially stimulated nodes.
Figure 3A:
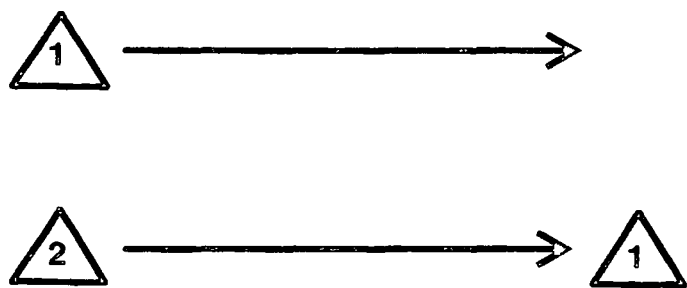
FIG. 3A) The emitted time of a stimulated z pulse is fixed as it moves to distal locations. This fixed time is a 'micro-memory' of the stimulated event, since it also acquires latency with distance.
Figure 3B:
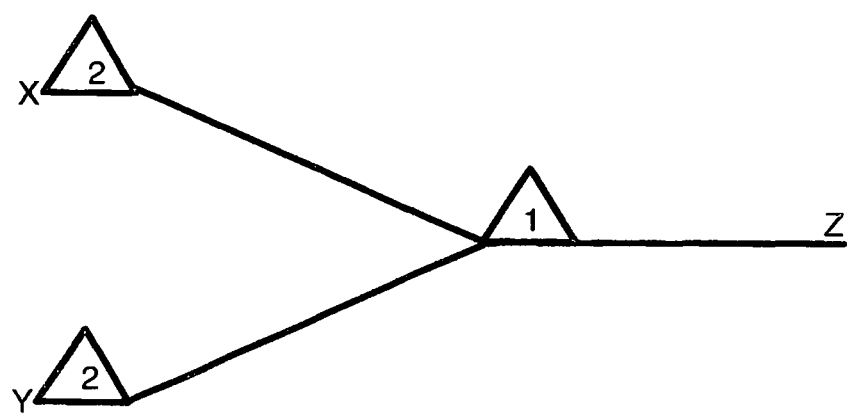
FIG. 3B) A stimulus area's x-y edge pattern emits temporally synchronous pulses at '2' that converge at a serial node '1' to reemit 1D z pulses. This serially sustained process illus-trates that 1D z pulses do not multiplex x-y information, but reemitted 1D z pulses temporally synchronize with 2D fixed time pulses locally mapped at sensors.

Conventional machine learning uses a resource and time intensive application of algorithms that learn responses by the repeated streaming of binary information through layers of digital switches in a neural network and so, in a successive trial-and-error back-propagation process, eventually 'recognizes' a temporal coded pattern indicated by probabilistic convergence to a learned template. The process described here reduces the in-tensive use of computer resources, by the standardization of nodes in circuit modules, or similar integrated circuitry specific to each serial 2D array, which are preset according to empirically derived convergent synchronization parameters (420). Superficially this is simi-lar to evolutionary algorithms, which iteratively evolve the fittest solution from temporally coded data, except the process here does not mutate or customize circuitry for each new application. Here a least-time maximal response results from the proximally sustained input pulses that synchronize with the distal few pulses that have reemitted through filtering circuits or convergent nodes, as shown in networked serial arrays shown in FIG. 1. The process here finds the fastest route for spatially and temporally synchronous pulses emitted by as little as one stimulus presentation, which least-time select one of many possible routes through circuits that are set and prototyped, to a few of many similarly responsive nodes with overlapping RFs (FIG. 2C). If different templates are previously presented to the neural network embodied here, the different routes that selectively activate different nodes in the last array define the similarity of subsequently presented 'new' stimuli. Different 2D sizes or locations of the same stimulus category, which temporally synchronize at spatially convergent midlevel nodes, synchronously reemit 1D z pulses that have no multidimensional properties, but maximally activate one or a few specific nodes in a large terminal array of nodes (150) that synchronizes with the proximally defined multidimensional information (FIGS. 1, 2A, 2B, 2D). Topographically repeated arrays respond to any orientation of features at any x-y location, analogous to simple cells in V1 cortex, which filter pulses emitted by different edge orientations in the specific feature pattern, to reemit 1D z output no matter what the 2D feature orientation, which diverge/converge to multiple nodes in the last array (FIG. 1), and also converge synchronous 1D pulse patterns from any stimulus x-y location into a shortest, rapidly reemitted z path with a proximally-distally synchronous response. 2D information is not transmitted to distal nodes by 1D pulses in this invention; spatial inputs temporally synchronize at serial 2D arrays of selective repetitive nodes, so that only temporally synchronous convergent 1D z pulses ultimately reemit. Proximal-distal z pulses synchronize the proximally sustained, specific x-y location and feature information at the same time as a distal 1D z filtered reemitted abstraction serially emits from spatially convergent nodes (FIG. 3B).

The function of coinciding temporal and spatial reemissions at serial nodes is not only rapid synchronization on convergent z-aligned axes, but when a phase-lock occurs at the same transient times at nodes as sustained by the previously emitted z frequency or a sensor array's gated shift frequency, no sequential transfer of temporally coded information occurs due to z pulses proximally emitted and sustained by the fixated presence of the same edge pattern. Here, the spatial pattern of x-y sensors stimulated by the edges of an image object or a moving edge, moves fixed emitted times of z pulses via links labeled by input sensor type. Initial impedance matching occurs because specific variable stimulus information evokes an equally specific, variable sensor pulse response. But rather than variable feature information coded and multiplexed over time in convergent connections to a terminal decoding site such as a CPU or GPU, here only synchronized emitted times of z pulses move. The fixed instant that a specific sensor or edge detector is stimulated to emit a moving pulse or phasic burst of pulses, is preserved by the movement of this burst in space and time along z axes (FIG. 4). Sequentially shifted gating (or sensor surface clock rate), is synchronized with the z latencies between linked nodes in serial 2D arrays. A just-stimulated population of an edge or shape pattern of pulses, corresponding to a stimulus shape, is synchronized at each cycle of the gating frequency of the initial sensor surface; these fixed emission-time pulses temporally and spatially synchronize with least-time precision at serial z aligned and convergent nodes, due to equal speeds, travel latencies and distances of the connections to a selectively filtering, least-time maximally responsive node in a serial array comprised of many nodes (FIGS. 1, 2C and 4). The variable information of a changing or moving stimulus pattern alters the sensor population that responds at any specific time, but is regulated by the orthogonally gated frequency or rate of pulses emitted at each incremented cycle of synchronized 2D time at the sensor surface. The emitted time of the pulse is fixed, even when elapsed over time, because the linked distance traveled by the pulse to the next rapidly reemitting, convergent node is proportional to the latency from the emitting x-y synchronized sensor location (FIGS. 2D, 3, 4). The equivalence of x-y orthogonal synchronization frequency with z axis synchronization frequency fixes the initial emitted time and convergent latent time of sequential pulses in the recurring pulse frequencies between pairs of linked downstream nodes (FIG. 3B).

Intrinsic temporal properties of generically defined pulses need analysis, to understand how the movement of pulse z locations past stationary anatomical nodes, induces contextual emergence of emitted, latent, sequential and synchronous time (FIG. 4). Anyone schooled in the electronic arts should be able to implement the circuitry that matches the gated timing frequency of edge-emitted pulses with phase-locked frequencies of the same now latent pulses at distally convergent nodes. The sustained, repeated cycling of z pulse emission times transiently integrate as a dynamic x-y-z 3D structure in a context of sustained sequential pulse times. In contrast, the short burst of pulses emitted by a large subset of RGC types, traditionally interpreted as edge detection, here facilitates temporal synchrony at convergent nodes, rapidly reemitting 1D z pulses serially at selective nodes to a specific few nodes in the last array, which precisely identifies/recognizes the stimulus, due to least-time reemission of maximal pulse numbers from the stimulus that match serial spatial topographies of spatially integrative nodes most precisely. Because least-time selective convergence to at least one terminal node exists (315, 320), many stimulus feature types are discriminable simultaneously by comparing maximal responses of least-time pulses in an array of terminal nodes.

Figure 4A:
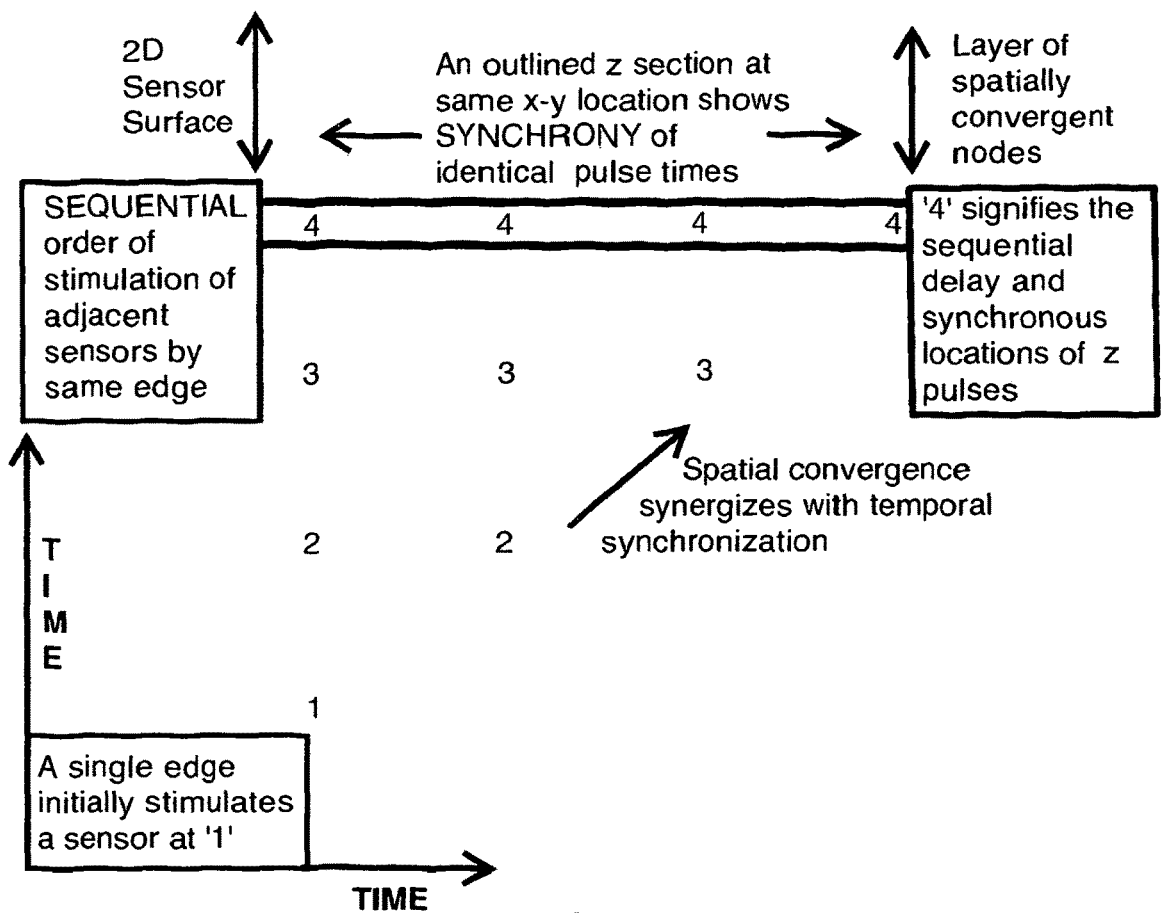
FIG. 4A) 2D time, mapped to orthogonal 2D spatial axes on a 2D page, analyzes generic time into synchronous, sequential, fixed emitted and latent time components. The lack of a location and time code tagged on identical z pulses, enables the dimensional reduction of serial 2D arrays by reemitted 1D z pulses in synchronous proximal-distal frequencies.

Sustained pulses, emitted from another large subset of RGCs, reemit pulse frequencies that approximate the latencies between linked nodes (FIGS. 2A and 4). This z synchrony due to sustained z pulses from the same edge or spatial edge pattern during fixation, last for the duration required to activate distal nodes by sequential traversal of serial 2D arrays. This sequentially generated proximal-distal synchrony allows distally delayed cognitive per-ception to track the current position of a target, without increased delays due to recurrent information processing of successive image frames of many targets to be rated as to rele-vance or impending danger. In this embodiment, phase-locked distal z pulses have the same synchronized time as that sustained by the proximal edge pattern (FIG. 4A).

Rather than spending many trials to train a neural network with various slightly different versions of a temporally coded stimulus image to create a probability of a correct response to a new stimulus, here the modular nodes in each serial array use a much reduced num-ber of training trials if used in concert with a learning algorithm, since the z pulses in response to similar stimuli take a least-time convergent z route, via serial filters of nodes in 2D arrays, which synchronize convergent pulses via intermediary nodes (300, 305, 310, 312 in FIG. 2C) to maximally responsive nodes in the last array. The continuously sustained proximal pulses emitted from the sensory array create a dynamic persistence of long latency z pulses on z axes; these sequential 1D z pulses create a z-axis continuity, over time and distally linked convergent nodes (400, 410, 415), which differentiates this invention from conventional phosphor persistence on a 2D screen that results from temporally coded raster scans of an image that blurs, or has a jittery strobed effect, from the x-y movement of objects or of the camera's sensor array, in the conventionally reconstituted image. This model of least-time convergent z synchronization at specific identifying nodes of many terminal nodes, in the aspect of the invention described here, is an advantageous alternative that uses less time and computational resources, than learning algorithms that sequentially compare targets with learned templates. In this invention one hardware/software design of circuit modules, using differentiating stimuli, determines with a minimal number of trial iterations, least-time/maximal response pathways of 1D pulses to identifying nodes in a last array.

Convergent Least-Time Synchrony and Stereo Vision

In another aspect of the invention, z synchronization is especially advantageous for 3D stereo vision, which requires precise timing of signals from dual x-y aligned monocular images in current technology, to create spatial-temporal differences in depth of the stereo image presented via screens or goggles to an individual's eyes. In the embodiment here, synchronous monocular z pulses emitted by the same x-y mapped edge(s) impinge at least-time convergent binocularly activated nodes, in serial arrays similar to the retinotopically aligned layers of V1, V2 and V4 cortical 2D surfaces (FIG. 2B). Serially linked binocular nodes (250) respond to the matched monocular disparities in the position of the same edge in the 3D connected edges of the dual 2D images. They also respond to the relative parallax, or distance to a moving object that becomes higher resolution, as the magnification of the object increases closer to the object. Here, binocular nodes (250) reemit rapidly only from monocularly matched links (210) that convey synchronized monocular pulses, with equal travel times from the same aligned x-y edge-locations. The convergence of synchronously activated monocular pulses from the same edge (200), in serial binocularly activated nodes that respond to the stereoscopic distance and the parallax at that distance as monocular sensor arrays get closer to the same edge of the object, reemits high pulse rates that correlate with the higher 3D resolution at close distance to the target. The synchronously summated, reemitted pulse times have a high binocular precision that increases with the increase in separation, or disparity, between the dual monocular sensor representations of the same edge. The selection of synchronous inputs from the same edge, by sequential 2D layers of retinotopically aligned binocular nodes, coupled with proportional pulse asynchrony that results from the degree of disparity and parallax of adjacent nodes with less precisely aligned monocular inputs, reemits to create a proximal-distal ordering of perspective and optical flow in 3D space. Because binocularly integrated, reemitted pulses are in temporal synchrony with the sustained, dually aligned monocularly emitted pulses, a monocular tag identifying x-y location and emitted time is not necessary and not communicated by z pulses in this embodiment, in which pulses spatially and temporally synchronize most precisely at a binocular rapidly responding node in an array containing a plurality of potentially responsive nodes. This continuously reemitted procession of sequential pulses at high frequency that repeatedly synchronize all stages of serial retinotopic nodes, which creates 3D stereo precision, improves on current procedures that use computationally expensive resources to calculate and extract, from the overlapping temporally coded spatial reference coordinates of dual monocular images, 3D location. The 1D z pulse serially reemitted least-time synchronization here, is not a multiplexed version of peripheral monocular information, but endures as an increasingly latent, precise, distally reemitted continuous response to the x-y synchronized, sustained emission times of monocular feature edge patterns. By avoiding repetitive algorithmic computations of absolute 3D reference coordinates at each increment in time, cumulative imprecision and temporal lagging between sequential monocular images are avoided in the embodiment here, when reemitted from temporally and spatially synchronous high pulse rates, onto stereo screens, in virtual reality goggles or robotic graspers. The implementation of convergent circuitry described here reemits more rapidly and precisely from temporally and spatially synchronous impedance-matched dually mapped inputs to 2D arrays of imaging nodes to create a less fatiguing stimulation of the goggle-wearer's eyes. Adjacently mapped nodes in a binocular planar array, do not rapidly reemit if a relative topographical asynchrony exists between monocularly stimulated sensors from the same edge, but do reemit rapidly to a screen (or screens) of stereoscopic imaging nodes if at equal latencies from edge-matched monocular images.

Spatial and Temporal Synchrony Mediate Space Constancy

In another aspect of the invention, a direct result of the temporal and spatial precision of synchronous input pulses at distal convergent nodes, is that the x-y jitter that necessarily results from edge-generated pulses resulting from the orthogonal gating frequency of the peripheral 2D sensor surface (or periodic shifting of a screen fronting the surface), is used to synchronize the temporal timing of z pulses emitted repetitively from the same x-y location of the sensor vis-a-vis a stimulus edge. Stimulus edge-crossings at a gated or clocked frequency emit z pulses that move at a speed synchronized with distance to serial arrays of spatially convergent but also retinotopically mapped nodes (FIGS. 2A, 2B, 2C), to match the timed intervals of gated pulses with summating latencies at pluralistic nodes in distal arrays (250), which reemits 1D z pulses from 2D spatially and temporally synchronous inputs at each phase-locked instant of emitted z time, preserving proximal temporal and spatial pulse resolution distally. Coincidentally, the spatially convergent temporally synchronous dual monocular pulses reemit a single binocular pulse without the x-y input jitter, due to the single z output pulse remitted from each x-y aligned pair of synchronized pulse times (FIG. 2B, 3B).

It should also be noted that due to physiological retinotopic serial array registry, spatial stability is always at a reference (0,0) position at serially convergent synapses, despite shifting of the visual field on a sensor array due to large saccades, which is easily replicated in artificial mechanisms. The binocular output synchronization from monocularly paired input pulses, spatially stabilizes each cycle of orthogonal x-y jitter without averaging over accumulated cycles of high gating frequency jitter. Current artificial paradigms that 'pool' via repetitious application of algorithms, temporally coded, temporally unstable images, so that a stable image is averaged over time, reduce the spatial and temporal resolution of the re-constructed image due to fine and/or continuous changes over time. In the embodiment here, because the x-y label of monocularly emitted z pulses is not present at a spatially convergent serial node (FIG. 3B), and a serially mapped node's reemissions have a period that synchronizes or phase-locks with pulses emitted at the sensor gating frequency (420 in FIG. 2D), the repetitively synchronized instant of the z dimension reduces binocularly aligned 2D surfaces to a proximal-distal perceptually stable 3D stereo structure, of high spatial and temporal resolution, at each reemitted phase-lock of the proximal gated pulse frequency (FIG. 2B). Multifunctional reemitted 1D z pulses mediate both binocular stereo synchronization and spatial stability; here, the impedance matched response of convergent z pulses that respond to any peripheral stimulus type does not require the conventional multiplexing of temporally coded information transmitted to a stable distally reconstituted image at spatially convergent terminal nodes in a last array. A regular frequency of reemitted 1D z pulses, without shifting 2D x-y information and thus x-y stable, spatially and temporally converge at repeated nodes in distal arrays; image stability is a property of temporally synchronized 1D z pulses and not of orthogonal topographical arrays encoding 2D information in larger distal RF areas. Because distal convergent z pulses also have a proportionally increased latency with no x-y jitter at the distal wavelength and frequency of proximal-distal synchronous pulses, emissions of the pulses can be skipped cyclically, while still retaining x-y-z stereo synchrony and phase locking at multiples of the proximal wavelength between pulse (FIG. 2B).

To restate the interpretation here, z pulses, analogous to physiological z spikes, are moving locations and fixed emitted times in one z dimension, not shifting x-y information that is decoded in the process of stabilizing the 2D image. The requirement for high frequency input pulses that converge at spatially convergent nodes within a short time window to cause reemitted pulses, eliminates noisy uncorrelated inputs at early stages of convergent circuits. Convergence of z pulses from several sensor types at a distal convergent node, does not average or multiplex presumed temporally encoded information emitted at the proximal sensor or pixel surface, but each stimulus edge at each sensor at the gating frequency, emits pulses that synchronize at a convergent node (FIGS. 2C, 2D). Because the z dimension is 1D synchronous and uses serial x-y spatial convergence to serially reduce reemitted z pulse rate at low stimulus intensities, convergent distal 1D z pulses are not affected by variable multidimensional properties such as orientation, size or reference loci of inputs (FIG. 2D). Z pulse reemissions from proximal x-y synchronized sensors, synchronize latently at distal arrays of node(s), which also stabilizes any peripheral jitter in x-y sensor responses, via synchronous convergence to one dimension of z pulses (FIGS. 3 and 6).

Synchronization of Proximal Precision with Distal Abstraction

Another embodiment of the sequential transfer of z location by pulses, shows that it is not necessary to repeat the precise sensor or pixel timing in subsequent serially convergent, synchronously activated z axis aligned nodes. While repeated x-y registry at serial 2D surfaces retains x-y resolution and precision (as spatially convergent monocular inputs for binocular stereo vision, for example), the fact that sustained fixational inputs emit from an initial sensor surface, means that a range in temporal delay or quantity of pulses at a convergent node may lose temporal resolution, though not sequential order, if the convergent terminal node does not rapidly reemit. This loss of precision with serial summations or recursion is, in microwave theory, a loss of quality (Q) factor, which defines quantitatively the loss in resolution. Here, synchronous timing of z pulses at the proximal sensor surface retains this timing at a distal convergent node if quickly reemitted at intervening serial nodes, or phase-locked with sustained proximal pulses. However, if pulse speeds are synchronized with proportional travel distances and latencies (FIG. 2B), this causes increased spatial and temporal convergence to lengthen the summation period at each serially active node (415), so that less temporally precise pulses reemit at distal convergent nodes. In physiological spike recording of FEMs and in some machine learning paradigms, increasing the time-bin duration for averaging spikes increases the positional and temporal stability of a neuron's RF, with increase in RF area. The longer summation period and longer latency of pulses at a convergent terminal node synchronizes with the rapid rate of emitted pulses sustained at proximal sensors or pixels (FIGS. 2C, 2D); the slower convergent reemitted pulse rate synchronizes at reduced frequency, but at every second, fourth, etc. cycle of the high sustained proximal pulse rate. The fixed emission times of pulses that have endured during fixation over a linked distance, is synchronous or phase-locked with repeated stimulation by a stimulus edge. Because this sensor-emitted, fixed pulse time is repeatedly present in the convergent receptive field of a terminal node, the synchronous effect is that sequential z time has fused with increased pulse latency.

Proximal-Distal Synchronization Embodied as a Reading Mechanism

In another embodiment of the synchronized movement of z pulses with no temporally coded information to convergent nodes, a rapid reading mechanism results. Such a mechanism requires the stepped transfer of z pulses stimulated by each orthogonally synchronized x-y pattern of edges that make up letters, words and sentences. The multiplexed transfer of all the information in the edges that make up letters as they are read, taxes the current ability of a central cognitive analyzer. However if the pattern of pulses in response to the letters in a word, temporally synchronizes at a convergent node that reemits a single pulse to a specific word letter pattern, then successive reemissions, from repeated convergence of z pulses emitted by spatial and temporal synchronizations of stimulatory letters, words and sentences, acquires a serial increase in abstracted meaning (FIGS. 2C, 3B). This graduated increase in context from convergent word summation is able to filter out discrepancies due to words that are interpretable in multiple ways. Rather than transmitting an increase in pulse rate corresponding to increased contextual information, the temporally synchronous z pulses emitted from spatially defined inputs, first as letters, then words, and then sentences, increase spatial convergence and temporally integrate as reemitted slower pulse rates at each serial node. Because the terminal convergent contextual interpretation of a sentence, reemitted from serial spatially convergent nodes by temporally synchronous pulses, synchronizes with z emitted times sustained by the proximal spatial pattern of letters, the information in the letters does not need to be coded and transmitted centrally as a temporal multiplexed code. The specific convergent route of z pulses to specific distal nodes is a function of the specific edge pattern that is x-y synchronous at sensors (330, FIG. 4B) and serially filters as an impedance matched proximal-distal z synchronization (FIGS. 2A, 2D). These proximal-distal relationships are specific to the x-y edges of letters, which result in least-time/maximal cascades of non-informational z pulses, which spatially converge via integrated nodes as shown for a simple circuit in FIG. 3B. The route to any of multiple nodes in the last array varies according to least-time reemissions of temporally synchronous pulses that impinge on the next equidistant convergent node in serially repeated arrays. This preprogrammed route can latently change according to the changed meaning of stimulus words or acquisition of new words, which can be programmed as changes in software that affect reemission parameters (420), or learned from newly asyn-chronous proximal-distal relationships that correct via synchronization at nearby nodes in the same array. Specific proximal sensor information synchronizes with the distal node's convergent synthesis of meaning and context from that proximal information; dissonant z asynchronies result if contextual meaning is not least-time consistent with proximal x-y data. The refinement of contextual meaning occurs with a window of exposure to stimulatory data at a sensor array that is long enough to establish successive temporal synchro-nies at spatially convergent serial nodes culminating at least-time distal nodes without requiring successive feedback of temporally coded information or a repetitively applied algorithm that learns to become more probabilistically accurate in recognizing a word sequence or other data by comparison with a specific template. The quickest route to any of many nodes in a last array, which repeats to exposure to the same or similar words, governs the convergent dimensional reduction of many proximal sensors in an x-y array, serially through arrays of similar nodes, to a few nodes in a last array. As shown in FIG. 3B, the 1D z pulse reemits from two or more synchronous input pulses, which are without location or time tags or an informational code. The 1D pulses have no 2D (such as letter location or font size) properties, due to repeated 2D arrays of spatial links that converge pulses; as moving z locations and times, serially reemitted pulses spatially and temporally synchronize in least-time with the actual variable sensor 2D information. This process does not diminish in speed or efficiency with increased amounts of stimulatory information, since here, only 1D temporal synchronies transmit through 2D arrays to distal nodes, and so reduce frequency with the distance or wavelength between pulses transiently at linked nodes (FIG. 2D).

Sensory Data Synchronously Converges to a Distal Synthesis

Other embodiments of spatial sensor convergence that temporally synchronize sensor-emitted pulses at serial nodes, are useful for integration of the outputs of for example, monochromatic color sensors, which respond differentially to the intensity of RGB or CMYK specific colors, at each specific image pixel, to give an integrated response specific for a single hue, among thousands possible. Anatomically, this distal retinotopic map reiterates the proximal image map, but this distal map integrates the x-y maps at the monocular retinas, not from a temporal binary pulse code, but is an embryonically preset structure that is hardwired in circuit modules in this embodiment. Here, z pulses converge to each x-y location in a distally reiterated map from the RGB, CMYK or other arrayed sensors, and so create an integrated map of convergent hues synchronized proximally-distally with each sensor x-y location (FIG. 2B). In physiological visual systems, 3D resolution requires high distal spike rates and reiterated spatial topography to synchronize x-y aligned proximal monocular and distal binocular retinotopic maps. The circuitry of each successive convergent node selectively responds to the spatial and temporal synchronies resulting from any perceptual feature, such as the tactually-sensed shape of a stimulus, or the visual characteristics of a specific face, or hue of an object, or its smell, according to the type of peripheral sensor or the topographical pattern of sensors stimulated, coupled with the specificity of convergent serial circuits that only rapidly reemit z pulses from the most temporally and spatially synchronized input pulses. Convergent nodes the most distal from the proximal sensor array have no specificity for sensor or pixel 2D location from phasic pulse inputs, but have synchronous proximal-distal timing with emitted times, or edge micro-memories, from sustained pulses that reemit at a distally reiterated map (FIG. 2B). Here a selective array of terminal nodes (150, 250, 320) are initially least-time maximally responsive to rapidly reemitted convergent pulse synthesis to identify a target, which z synchronize by sustained latent convergence of z pulses, from specific sensor loci during the fixation period, to perceive the 2D characteristics of the identified target.

Embodiment of Convergent Synchrony as a Locating and Grasping Mechanism

Figure 7A:
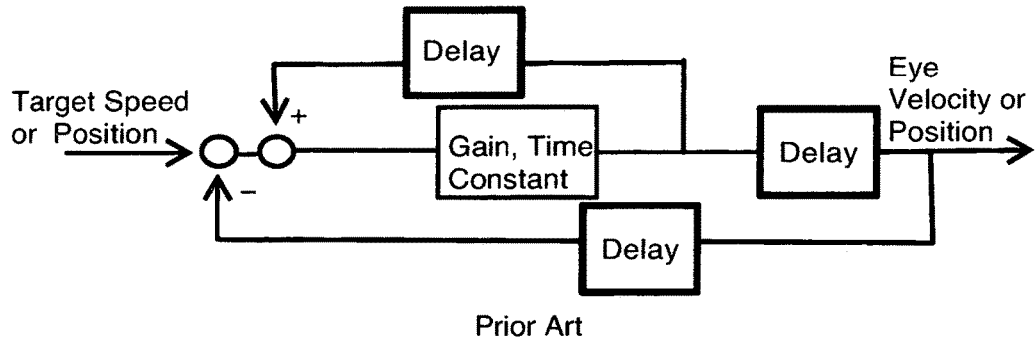
FIG. 7A) Conventional feedback of temporally coded information requires delays for algorithms to compute spatial errors. These delays reduce precision near the moving target, when more is needed.

In an embodiment of this invention, reaching inaccuracies of a robotic hand as it closes on an object, which are due to the increased relative motion that stimulates imaging sensors with increased transitory data as the object nears (FIG. 7B), can be reduced by not reconstructing serial image frames at a central processor, which in current technology requires large amounts of data processed at a constant clock rate that reconstructs image frames, therefore delaying and blurring the computed position of the looming object (FIG. 7A). Likewise, locating and identifying a distant object for perceptual relevance or looming danger is facilitated if initial processing is by an array of topographically selective sensors that converge to nodes that respond fastest to temporally and spatially synchronous inputs from sensors that selectively respond to traffic signs or looming situations. The delays implicit in reiterative processing here improves by the temporal synchronization of z pulses between convergent nodes stimulated from sensory 2D surfaces, so that the variable or motile edge information in the image stays at the peripheral 2D sensory interface, but transmits 1D z pulses at dynamic rates. These higher pulse rates synchronize the most rapidly activated (or least-time) destination nodes with edge features transiently selected by specific, nano-sized sensors of different types (330). Reemitted z pulses at serial convergent nodes, with a timing periodicity synchronized to the orthogonal sensor emission timing of motion-stimulated target-edge events, here do not preferentially respond to non-looming, distant stimulus features with little optical flow. With increased rates of motion-stimulated edge pulses from sensors nearing the looming target object (FIG. 7B), more rapid spatial and temporal summations synchronize at higher pulse frequencies at distal convergent coincidence detector nodes, especially as the image object drifts across and is not centered on the sensor array. As shown in FIG. 6, aligned locations of a target edge and the nearest sensor in an array, synchronize rapidly as a stimulus edge drifts across sensors; edge motion and convergence of pulses due to a stimulated increase in target size to a node synergize, to increase the frequency and reduce the latency of the edge emitted pulses at a serially convergent node. The convergent pulses that synchronize at maximal response rate and reduced latency from the same target edge, increase precision of a sensor in the array with respect to the target being located or grasped. Emitted pulse times in unaligned nodes (with respect to the serially aligned node pair currently under observation nearest the target edge), may be interpreted by an observer as 'error' responses. But if the pair of serial nodes is adjusted so that pulse least-times and shortest travel distances are selected for observation, this target edge alignment error is much reduced (shown by higher pulse frequencies in FIG. 7B). Increased precision does not require coding and transfer of negative feedback information of off-center spatial reference locations to a central processing unit (FIG. 7A), but coinciding 2D sensor and motor control maps rapidly stimulate corrective off-center pulse reactions, which increase convergent summation of 'error' and correctly aligned pulses to a last serial node(s) (FIG. 6) that responds in least-time, therefore most precisely, to the moving aligned target edge.

Figure 7B:
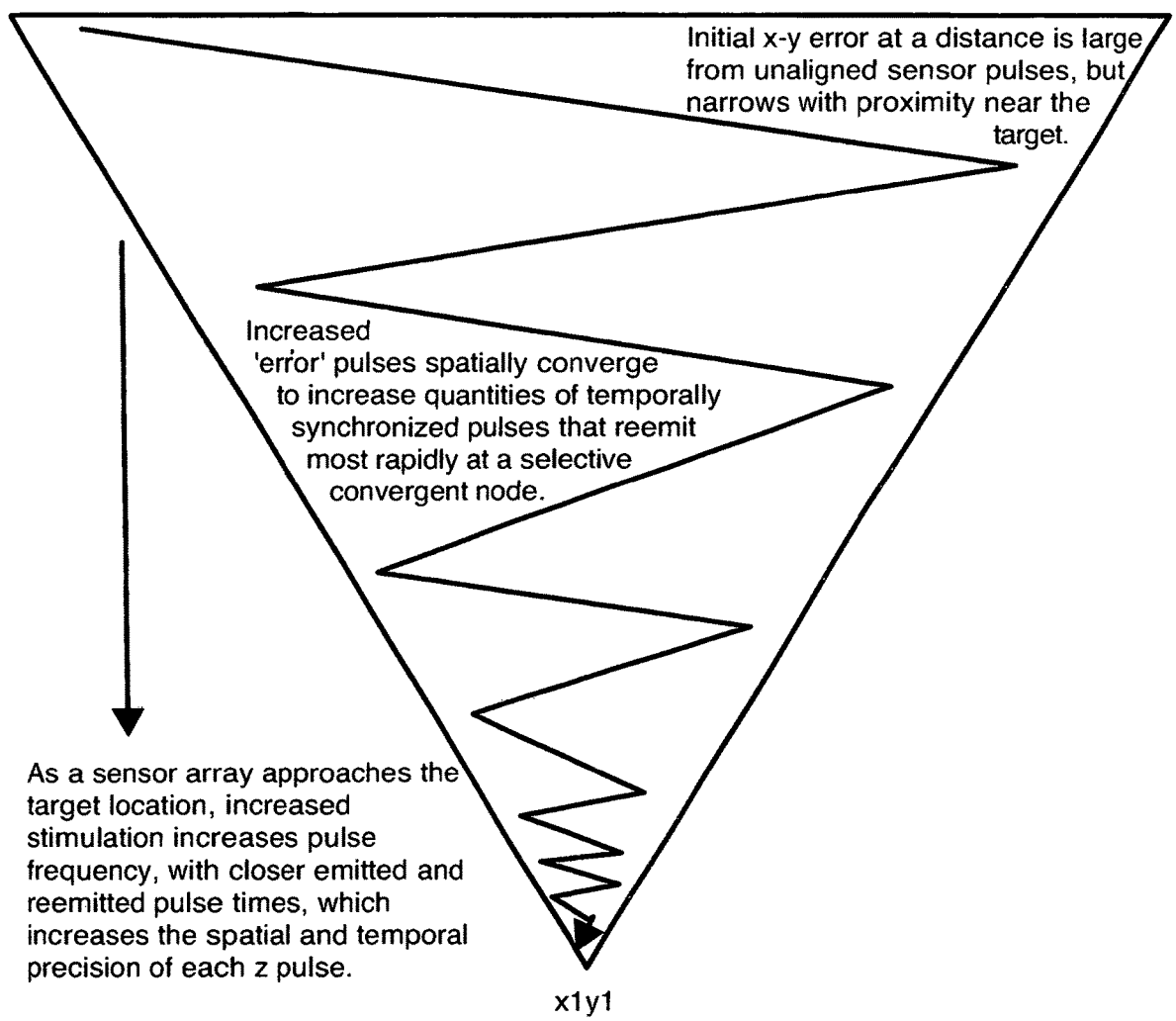
FIG. 7B) Pulse rate from a 2D sensor array increases as it nears the target, thereby increasing the precision and decreasing least-time convergence of pulses to feature identifying nodes in the last array.

In a similar aspect of the above embodiment that uses pulse repetitions that synchronize without transmitting temporally coded 2D information, the stimulation times of sensor emitted pulses are fixed as micro-memories (FIGS. 3A, 4B), which increase precision and least-time maximal response with increased pulse emission rates. Peripherally emitted micro-memories at specifically mapped event or edge detectors, are retained as fixed emission times due to sequential synchronization, or phase-lock, with sustained proximally generated sensor pulse frequencies. Again, if these fixed emission times sustain after a short stimulation time or due to the sustained presence of the stimulus object on sensors repeatedly stimulated at the peripheral gating frequency, distal z axis synchrony results. Circuitry embodied here that is roughly analogous to that in the brain's cerebellum, uses the topographical input lines, each with temporally synchronized z pulses, to increase convergent precision at a least-time reemitting node, despite the temporal delays of pulses sustained from changing target positioning as a visual and/or tactile 2D sensor array nears the target (FIGS. 5, 6, 7). Traditionally this is explained by negative feedback that uses the repeated application of the same algorithm to increase accuracy from increasingly precise reference coordinates if the target is stationary or in a predictable trajectory (FIG. 7A). But due to feedback delays, if the target moves unpredictably, precision and accuracy are lost. It is also established in physiological systems that efference copy, a form of predictive feedback, has two orders of magnitude less precision, at several arc-degrees, than the resolution of a retinal receptor with a precision of a single arc-minute, so cannot stabilize the jittery image of a target caused by FEMs. Here, these feedbacks are replaced by the orthogonal x-y precision at repeated sensory-motor 2D surfaces traversed by least-time z pulses, stimulated by a moving or stationary target. In the embodiment described here, sustained orthogonal shifting at the sensor surface across 2D x-y stimulus edges, clocks or gates the repetition of precise, fixed-time micro-memory 1D z pulses, which temporally synchronize the sustained emission of pulses that spatially converge most rapidly along linked z axes. Because fixed emission, edge-generated times are preserved by the synchronized, rapid reemission of z pulses in x-y topographical maps of the repeated micro-zone surfaces in the cerebellum, the greater spatial resolution of sensors in close proximity as a sensor array nears a target, serves to increase the temporal and spatial precision of pulses stimulated by an unpredictably moving target. In this embodiment, just-in-time increase in precision as a target nears is not in temporally coded feedback information, but is due to fixed micro-memories of increased z pulse rates, causing more rapid temporal and spatial z pulse synchrony of sensory-motor aligned topographical 2D surfaces (FIG. 7B). This proximal precision is not governed by a predictive efferent copy of low accuracy, but requires the continuously shifting transient alignment of temporally synchronous z pulses as they move through repeated topographically mapped 2D surfaces (FIGS. 5, 6), as hypothetically occurs in the cerebellum. This proximal-distal z synchrony tracks a moving target, detecting and reacting to small x-y deviations sensed by a sensory array in near real time as a target looms in higher resolution (FIG. 7B).

In embodiments for the multiple functions of locating, identifying and grasping a target here, increased convergence of generic 1D z pulses that more rapidly summate and reemit at an increasing rate or frequency, at a node in a distal array most closely x-y aligned (or least-time precise) with the target, are required. Here, 2D sensory data converges x-y location intensities as generic multifunctional 1D z pulses without any binary coding or decoding of information to reconstruct a 2D image. As implemented here, continual sensor realignment due to the target position in space emits pulses that summate and synchronize more rapidly than repetitive feedback of changing reference 2D location data; particularly useful in the embodiment here is that generic sensor pulse rates increase with target looming and target size. If one uses neural circuits in the cerebellum as a model for the embodiment described here, the few distal long latency pulses align with new pulses at proximal 2D maps, to center moving visual and tactile sensors with motor x-y misalignments (FIGS. 5, 6, 7B), which increase pulse rates just as misalignments occur. The sensory response to mo-tor misalignments increases in spatial and temporal resolution, due to more rapid rates of pulse fixed emission times, as the sensory surface nears the looming target (FIG. 7B). Conventional information feedback of changing target reference locations via looping circuits introduces delays, which cause feedback gain error and oscillations.

An Embodiment of Convergent Synchrony for Brain Machine Interfaces

The continuous motor realignment of the sensors composing a surface as it nears a target, in response to targeting error, is also important for the design of BMIs. BMIs require the repetitious application of algorithms to decode, or translate, cognitive cortical spike patterns into muscle contractions specifically directed to a particular reach and muscular configura-tion with respect to the recognized target. However, in contrast to muscle potentials re-corded peripherally in response to cognitive intention, there is much variance, from day to day and trial to trial, in these cortical spike patterns, even though inputs are the same. The heterogeneous inputs, recorded at synchronous times by an electrode array on the cortex, are due to the unknown origins and emitted times of the recorded spikes from other cortical areas, along with neural adaptation and varied tuning over time of specific neurons to prop-erties of the motor movement, such as its varied direction, distance and speed to the same reach endpoint. Because spike patterns are conventionally interpreted to be a code requiring decoding of distance, speed and directional information as a reach occurs, experimental variance exists. Here this variance is resolved by the interpretation that successive spatial and time synchronies of z spikes at convergent nodes in sensory-motor 2D surfaces reemit as a 1D z dimension, as shown in FIG. 6 (based on the simple convergent mechanism of FIG. 3B), which is synchronous with, but does not encode 3D movement information that is emitted from heterogeneous nodes of varying distances and locations from the cortical recording electrodes. In the embodiment described here, because only the reach endpoint is preset in advance (FIG. 5), sensory-motor x-y alignments readjust in near real-time, proximal-distal synchronization of the z dimension. This 1D z pulse rate emitted by any node, as defined here, is synchronous at serial, distally increasing locations along convergent routes during the reach (FIG. 5), however aggregation of heterogeneous spike signals to make the signal less noisy loses this serial temporal specificity that is present in single trials and in distal nerves in which pulse intensity activates terminal muscle fibers at any specific time. The coding-decoding process of conventional BMIs also creates a feedback lag that is inherently variant with respect to the time of the sensory inputs (FIG. 7A). In fact, recorded spike times, measured as duration and amplitude in experiments, are the dominant physiologically invariant property (here, this invariance is the constant ratio of proportional location/ time of pulses in the z dimension). At the start of a reach in motor cortical populations of neurons, information about reach characteristics such as distance, speed or direction are not initially measurable in the trial. Statistical analysis of the complete data results in a single dimension of time that is shown graphically to be invariant, despite the multiple dimensions of the reach (its distance, speed and direction) which do vary, and is most predictive of subsequent shortening of reaction times in trial-to-trial reach experiments. A realization of the embodiment here as shown in FIG. 6, with a more precise knowledge of the origins, emitted times and latencies of specific spikes, routes and convergent connections between and within 2D surface maps, can be obtained with multiple cortical electrode arrays. Proximal-distal distributed computation can synchronize realignments as they shift among neurons during the course of the reach to a target. The focused z synchronization to a single x-y alignment as resolution increases near the target (FIG. 7B), is proposed here to increase accuracy, without the repeated application of algorithms that delay the resultant target's computed location. The inherent lag of looping feedback circuits (FIG. 7A), along with the heterogeneous factors stated above, limits accuracy and precision of current algorithmic methods used in BMI experiments, which have a reported variance of 50-70%. Because z location/time here is 1D and is the dominant property at high resolution at convergent x-y locations of linked serial nodes (as shown in FIG. 3B), the proximal-distal z synchrony of pulses in the embodiment here, reduces probabilistic variability of synchronous pulses as lag diminishes near the target at higher stimulated pulse frequencies (FIG. 7B).

To recapitulate, the sensor-generated fixed emission times of pulses stimulated by edges or the filled area of a stimulus object, constitute a population of collective micro-memories with temporal and spatial precision, which spatially and temporally synchronize at frequencies inversely proportional to the distance and latency between linked nodes (FIGS. 2A, 2B, 2D). The population of proximal sensors activated by stimulus edges, responds synchronously to the gated frequency of the shifter array (FIG. 4A) or to larger movements of a stimulus across the array (FIG. 6), due to the high spatial resolution of the sensor array and temporal resolution of the emitted z pulses. The serial outputs of convergent nodes in aligned, repeated 2D surfaces would thus convey a sequence of spatially varying population responses, at any clock- or gated increment of synchronized pulses, which is due to rapidly reemitted temporal and spatial convergence within the sustained proximal-distal synchrony best visualized and enabled by 2D time (FIGS. 4A and 4B; 3D time of 3D physiological volumes are not shown). The embodiment here requires that sensor-emitted pulses temporally synchronize proximally detailed or moving stimulus information as it occurs in near real time, with distal z pulses recorded at the cortex in latent perceptual time. Proximal sensory-motor time near the target is very precise due to higher pulse rates, which, when synchronized at cortical recording sites more latently in time, is perceived in a context of proximal-distal temporal synchrony. This embodiment and others can be used with data stored in various memory devices such as RAM, ROM, EEPROM, the cloud or various other data storage circuits.

Theory of Synchronized Memory Retrieval

Figure 4B:
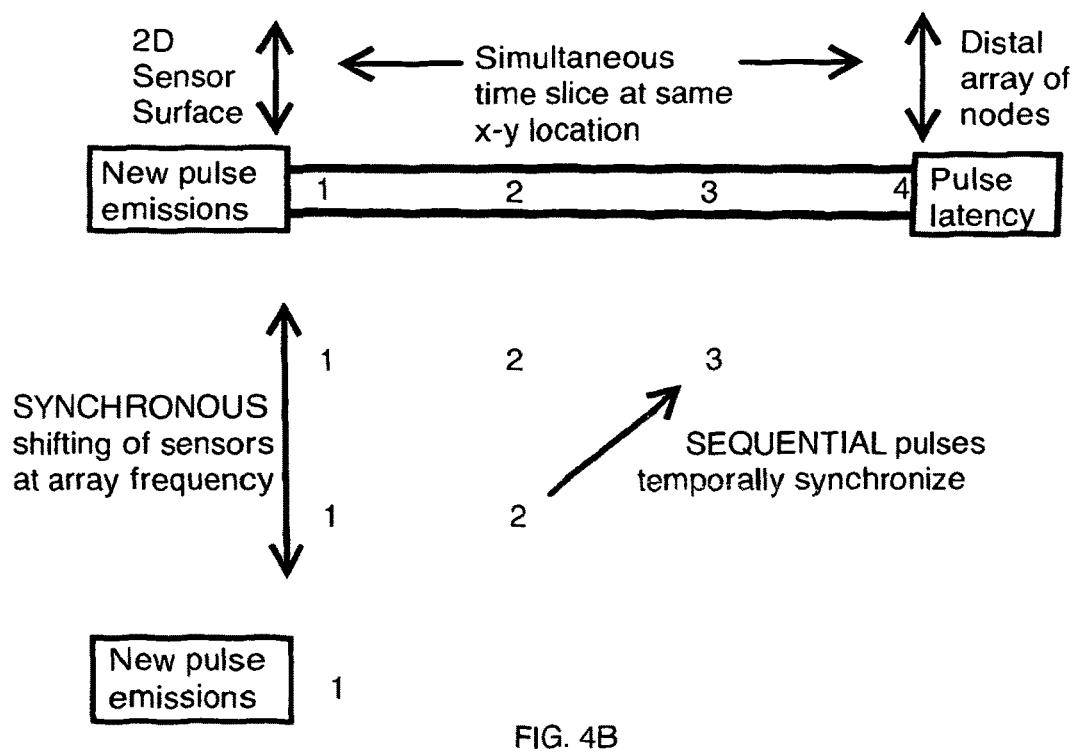
FIG. 4B) Fixed pulse times at a 2D sensor surface emit synchronously at a gating frequency; the emitted pulses retain these times as micro-memories, due to the constant distance/latency ratio resulting from temporally synchronous input pulses at nodes that summate and reemit 1D z pulses rapidly.
Figure 5:
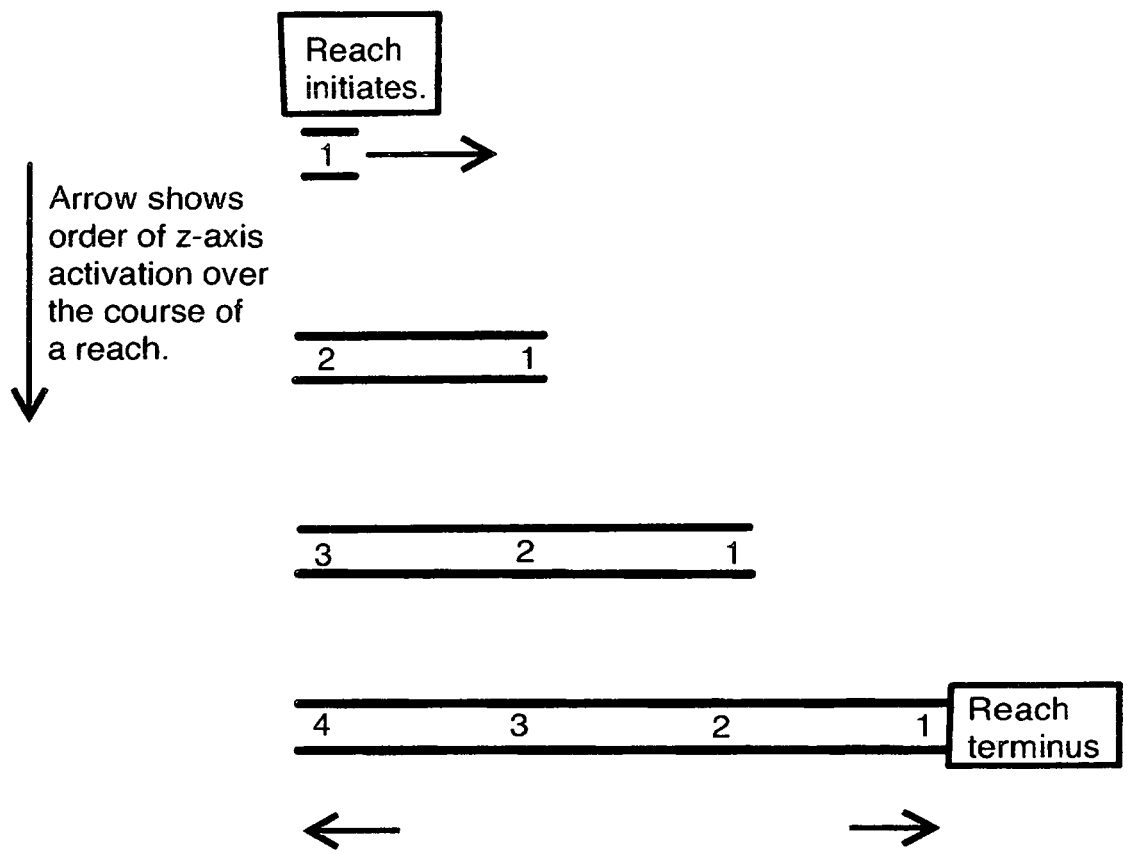
FIG. 5) During a reach, sequential z pulses synchronize at progressive locations along the z axis.

In the embodiments, aspects and variants of the invention described here there is no transfer of conventional temporally coded information by 1D z pulses. Parallel 1D z pulses emitted cyclically at an array frequency (FIG. 4B) (in conventional physics, interpreted as planar or surface waves), comprise a synchrony that does not transmit coded information that reconstructs a sensory image, but which phase-lock serial arrays of nodes up to and including a last array. The properties of sequential, synchronous, emitted and latent time are intrinsic qualities transiently present in generic z pulses as they speed through connected paths of convergent nodes in serially aligned arrays (FIGS. 3B and 4A, 4B). An interchange of time and space between moving pulses and fixed nodes is contextual, based on a time that is not standardized by convention, but on the equation c=frequency (variable time unit)×wavelength (inversely variable z distance). Rapid synchronization (or 'anticipatory synchronization') requires multiple pulses at a frequency and speed that are transiently present at each serial 2D surface over an encompassed interval of distance/time with a constant ratio. In traditional circuits, it is required that information is encoded in a form, such as multiplexing, so that informational conflicts are not at an emergent perceptual or decoded level; 1D z pulses, in contrast, retain convergent 1D fixed emission times that temporally synchronize with complex 2D information impinging on sensor surfaces, and as organized on 2D cortical surfaces or in serial arrays, such as those in the hippocampus. If an emitted pulse has lasted through several layers of convergent nodes to accrue a long latency at a long z distance, with an accompanying long synchronization period, its endur-ance has a perceptual validity over pulses with shorter emitted durations.

In physiological and physical systems, the characteristic unit time is proportional to the characteristic unit distance for any specific material, to give a characteristic constant speed; this photon or electronic pulse speed is a constant called c. C is not only constant at any relativistic speed of any visual observer, but constant c speed is also due to any unitary time inversely proportional to unit distance in any observer neurons, as in the equation c=frequency×wavelength, which holds in the repeated, anatomically defined repetitive 2D arrays in any observer's visual system, in hippocampal areas and cortical surfaces. The repeated, event-stimulated spikes that traverse 2D arrays, create a relativistic context in which the sequential fixed times of multiple 1D spikes rapidly synchronize and reemit from fixed 2D arrays that synchronize time orthogonally and reemit in sequential z time. The relative observer's coordination at a single distance or location, with the distances of locations of other observers (or proxy instruments) at the relativistic constant c, requires this transformation of external variable unit times and distances to x-y edge-stimulatory sensor events that emit 1D z pulse fixed times as micro-memories. That relativistic pulse speed of micro-memories is a constant distance/time ratio that coincides with synchronous activation of wavelengths and frequencies at stationary 2D arrays of nodes, is not just coincidence, but a mechanism that ties cognitive search of memories at specific 2D memory locations in which moving, fixed micro-memories (FIG. 3A) of 1D z pulse time and stationary nodes in 2D arrays are relativistically interchangeable when synchronized.

As an impedance matching mechanism, the speed of z pulse emission dz/dt (distance/latency), synchronizes 1D z pulse rate as moving z locations with orthogonal 2D x-y topographical arrays of nodes. The synchronization of 1D z pulse speed, pulse emitted rate and distance between orthogonal 2D locations, as well as relativistic relationships between the reference visual observer's synchronized sensor plane and other observers with synchronized sensor surfaces, is shown with the integrative constant c of pulses emitted direction-ally on any z axis. C is a relativistic constant because it matches various external optic flow speeds at varied spatial z distances with any observer's orthogonally synchronized 2D reti-nal plane, which synchronizes output z spikes (despite the asynchronous phases and frequencies of received inputs) with each cycle of an observer's physiological FEMS or clock rate. In modern physics the constant 'c' is an externally measured property (however the origins of this constancy are philosophical and perceptual (in a book by the physicist Ernst Mach in 1900), which couples the 'c' constant, measured at any observer's orthogonally synchronized sensory plane or measuring instrument, with z axis photons emitted and received from physical space. Measured c is a constant ratio in 3D connected space perceived by any single observer, thus defining the impedance match of proportional 10 distances and transit times of emitted photons in 3D space, with sequential synchronized 1D z pulse times gated at serial orthogonal 2D surfaces. Orthogonal 2D x-y arrays and moving 1D z axis pulse or spike locations synchronize as one 3D resonant structure, so that disso-nantly timed impingement of 3D emitted photons acquire a regular, or synchronized context, from spatial and temporal summations that reemit from nodes.

What is claimed is:

1. A system comprised of at least one of a pulses selectively propagated through a set of serial 2 dimensional (2D) arrays implemented as an electrical network, the system comprising at least one of a sensors in a first array that emit the pulses due to at least one of visual, haptic, microwave or ultrasound stimulation, via links connecting to at least one of a nodes in the serial arrays, the pulses serially propagating by emission of at least one of the input pulses to at least one the nodes in the serial arrays, with a minimal summation number of the pulses and a maximal temporal summation duration configured as a parameter, adjustable to reemit at least one output pulses, which pulses in turn, converge as inputs to at least one the nodes in downstream arrays, thereby serially propagating pulses to at least one the nodes in the last serial array;

wherein, stimulation comprising at least one of a) a feature pattern and b) a sequential moving event, empirically determined as a target from previous application of a same and similar stimuli, emits pulses from sensors that selectively propagate in serially linked nodes, and which pulses emitted from at least one the stimulated sensors of the first array reemit serially from the downstream nodes to at least one said nodes in the last array;

wherein input pulses, which emit output pulses from at least one nodes configured by the adjustable parameter, emit an output pulse latency required to travel a linkage distance between at least one the nodes and at least one the downstream serial nodes, which pulse latencies summate to the maximal temporal duration of at least one nodes, which duration is adjustable as the parameter necessary to emit at least one output pulses from at least one the nodes from temporally synchronous input pulses, which outputs reemit a least-time summated duration of pulses to at least one nodes in the last array;

wherein the pulses emitted by stimulated sensors, by the least-time selective propagation of said pulses reemitted through the serial nodes to at least one the nodes in the last array, serially reemit from the target stimulated 2D locations in the sensor array to at least one nodes in the last array, in which at least one of 1) at least one the stimulated sensors signal a 2D array location, 2) a reference position is designated, 3) no 2D array location or reference position is signaled by sensors.

2. The system of claim 1, whereby the stimulus feature pattern emits temporally synchronous pulses from a group of the sensors or nodes by links to at least one the serial nodes, which rapidly emit output pulses when the feature pattern substantially matches at least one the sensor or node group pattern, whereby reemitted 1D pulses input to downstream nodes that reemit pulses from substantially synchronous pulses to at least one serially connected nodes, and thereby reemit a maximal frequencies or a rates of serially selective pulses, from the array locations of stimulated sensors to at least one the nodes in the last array.

3. The system as in claim 2, in which at least one temporally synchronized pulse latencies aggregate as a pulse frequencies emitted between at least one nodes and at least one downstream serial nodes, in which the maximal summated pulse durations are adjustable with the parameters to cause reemission of pulses from at least one the serial nodes to nodes in the last serial array, in which concurrently emitted sensor 2D array pulses, by at least one serially synchronized pulse frequencies, operationally connect to downstream nodes, including at least one the nodes in the last serial array.

4. The system of claim 3, comprising a sensor array frequency is caused by a frame rate or an oscillation frequency of the sensor array, or a relative motion between the sensor array and an occluding screen configured with a periodic amplitude substantially matching a minimal diameter of the sensors in the array, whereby configuration of said array frequency sustains pulses that synchronize with the pulse frequencies or a harmonics thereof, the pulse frequencies adjusted by the parameters so that at least one pulse reemits from summation of the minimized latency pulses to at least one serial downstream nodes to at least one said nodes comprising the last serial array.

5. The system of claim 4, wherein the array frequency sustains pulses emitted by the stimulus target that synchronize with the at least one pulse frequency or harmonics thereof, selectively propagate as convergent 1D pulse locations with serial emitted times, which operationally connect as at least one temporally synchronized pulse frequencies, target stimulated sensors at 2D array locations with convergent 1D pulses selectively reemitted by at least one nodes in the last serial array;
  wherein, the synchronization of the array frequencies with emitted pulse temporal frequencies, which impedance matches 2D arrays and 1D pulses through those arrays, is expressed as at least one of a direct proportionality of a distance/latency and an inverse proportionality of a frequency multiplied by a wavelength, coupling at least one emitted pulse a micro-memory and at least one a fixed array location.

6. The system of claim 5, wherein sustained said pulses, selectively propagated due to the temporal synchrony of the pulse frequencies of substantially equal convergent latencies from the stimulated sensors, serially reemit from serial nodes at the pulse frequencies adjusted by the parameters to most rapidly reemit serially convergent output 1D pulses from downstream nodes in the set of serial arrays to at least one the nodes in the last array.

7. The system of claim 6, comprising the parameters that modify the emitted pulse frequencies between at least two the serial nodes, are adjustable with at least one of a configured controls, thereby optimizing the convergent reemission of spatially and temporally synchronous pulses, for increased precision and accuracy of output pulses and so with a temporal resolution of emitted pulse times, in which said output temporal resolution increases with maximized said frequencies of the convergent output 1D pulses to at least one the downstream serial nodes.

8. The system of claim 7, comprising that stimulation by the target, of synchronous pulses at the array frequency with serial emission times from a pair of monocular sensor arrays, move via the shortest latency links to at least one binocular nodes in at least one serial arrays that summate convergent temporally synchronous pulses, which thereby reemit 1D output pulses at said maximal frequencies from at least one the binocular nodes;
  wherein, monocular emitted pulses, at one cycle of the synchronized 2D array frequencies and 1D pulse frequencies, is sufficient to represent 3D connectivity of varied stimulus target distances, at one synchronized 2D time and 1D emitted time;
  wherein, the stimulated pulses emitted from a pair of the monocular arrays at the array frequency, determines, from the emitted times of pulses from the same target pattern edges that rapidly remit 1D output pulses from convergent binocular nodes adjusted for precision and accuracy by the parameters, the location of the stimulus target with reference to the monocular arrays, or with reference to the reference position, or embodied in a stereoscopic device.

9. The system of claim 8, wherein the linked nodes in serial arrays, includes but is not limited to at least one of: 1) the temporal synchronization of the input pulses with the output pulses at pulse frequencies adjusted with the parameter between at least two the serial nodes; 2) said stimulated sensors in the first array that emit pulses with serial emitted times over a sustained time, do not lose said temporal resolution at emitted pulse frequencies synchronized with the emitted array frequency.

10. The system of claim 9, wherein the sustained emitted times of sensor pulses stimulated by the target, which selectively propagate as the serial output 1D pulses, do not necessarily encode, multiplex or attach the information of the 2D array locations of emitting nodes in said reemitted pulse frequencies of serial 1D output pulses that converge to at least one nodes in the last array.

11. The system of claim 10, wherein the sensor pulses emitted at the array frequency, synchronize with the pulse frequencies by adjusting the parameters, whereby the adjustment synchronizes the pulse frequency emitted by the features of said target with the duration to at least one downstream serial nodes, in which a pulse timing precision at serial nodes increases with increased pulse numbers summating within a shorter duration of time, in which the rapidly reemitted pulses, at maximized frequencies with closer emitted times, are a temporal measure of the precision of the target features.

12. The system of claim 11, comprising that the adjustment of the parameters varies the pulse frequencies to at least one the nodes in the last array, which empirically selects the precise and accurate emitted pulses of the target from pulses emitted by similar features of a different target, but which similar target features selectively propagate convergent output pulses, with all other factors kept controlled, via at least one of a) reemitted pulses of a lesser number and reduced frequency to at least one said nodes in the last array, and b) reemitted pulses of a differing frequency to one or more different nodes with differing target selectivity in the last array.

13. The system of claim 12, wherein the selective propagation of pulses rapidly reemitted to at least one the nodes in the last array, accurately recognizes the precise target features empirically determined by prior presentation of said target, shown empirically by convergence of serial pulses to at least one the target-selective nodes in the last array, and empirically tested with different targets composed of similar features, in which pulses from said target features selectively propagate maximal frequency output pulses, due to convergence of temporally synchronous pulses emitted by the said target features to downstream nodes in serial arrays, which reemitted pulses thereby operationally connect the sustained pulses emitted from the sensor array by said target features, with at least one said target stimulated nodes in the last array that maximally respond in the least-time to serial convergent pulses emitted by the target feature pattern.

14. The system of claim 13, wherein said target feature pulses emitted at the sensor array frequency, which selectively propagate by emitting maximal frequencies of temporally synchronous pulses at serial nodes, which by converging 1D pulse outputs emitted by variable 2D orientations, locations and sizes of said target features, by adjustment of the parameters, thereby operationally connect the variable sensor array locations stimulated by the precise target features, with at least one target-stimulated nodes in the last array.

15. The system of claim 14, further comprising additional nodes that record the emitted time and the 2D sensor location of pulses emitted by said sensor array, with a record of a received time and the location of at least one said nodes in the last array that receive serially reemitted pulses that converge maximal frequencies from said precise target features and similar target features, for an empirical determination of said sensor emitted and convergent reemitted pulses to the target-selective nodes in the last array.

16. The system of claim 14, wherein pulses temporally synchronized at said pulse frequencies or the harmonics thereof, adjusted by the parameters, in which temporally synchronous convergence of pulses at downstream serial nodes, serially reemit convergent output pulses to the nodes in the last array, reduce pulse frequencies and increase the selection by reemitted pulses of target features or patterns that selectively stimulate nodes and groups of nodes in serial downstream arrays, in which the selective propagation of pulses to at least one node in the last array, does not require the sensor 2D locations to be determined to correct varying sensor locations stimulated by the said target features or patterns, in convergent pulses to at least one the nodes in the last array.

17. The system of claim 16, wherein the pulses emitted by at least one the moving sensor arrays when stimulated by at least one the target feature patterns and target moving events, increase pulse frequency as at least one the sensor arrays approach the target, due to a larger looming size of the target area, which increases the number of stimulated sensors, thereby causing more precise alignment of the sensors in the array due to a lessening distance to said target, whereby the increased pulse frequencies due to the looming size of said target converge, summate and reemit more rapidly, at higher pulse frequencies, in downstream nodes to at least one the nodes in the last array;

wherein pulses emitted by the sensor array increase in number due to increased a relative parallax motion of the target due to the lesser distance to the sensors, in which the increase in the relative parallax motion causes higher frequencies of pulses to converge to at least one the nodes in the last array, thereby operationally connecting at least one the nodes in the last array with concurrently emitted pulses stimulated by the moving target at the sensor locations, which aligns the target location accurately and precisely with the 2D sensor location due to higher pulse frequencies, as the sensor array lessens the distance to zero at the looming target.

18. The system of claim 1, wherein pulses or spikes are both implementable as similar moving 1D locations with emitted times at the array frequency, but that in embodiments here, do not necessarily encode informational 2D signals that matches patterns with at least one of a sensor image pattern stored in memory.

19. The system of claim 1, wherein embodiments are at least one of digital and analog circuits in nodal networks implemented as at least one of neural networks, in which the reference position can be implemented by at least one of robotic graspers, brain computer interfaces, prosthetic devices and optic flow devices, or any other device or instrument, in which at least one of speed and accuracy and precision of target recognition, categorization, identification and location are increased by the embodiments described in this invention.

20. A method comprising emission of at least one a pulses from a sensor array stimulated by at least one of 1) a target feature pattern and 2) a moving target event, in which pulses selectively propagate in steps of a serial summations of temporally synchronous pulses at a serial nodes in a set of serial arrays, reemitting to at least one the nodes in the last serial array;

wherein the serial nodes serially summate pulses with serial emitted times set by configuration of a sensor array frequencies, to summate output said pulses that reemit to downstream nodes, including at least one the nodes in the last array, whereby said steps of selective convergence of pulses at serial nodes establishes at least one of a pulse frequencies, which summate pulse latencies as a duration at each serial downstream nodes adjusted with a parameters to emit at least one pulses to downstream nodes in serial arrays, thereby operationally connecting, at the synchronized pulse frequencies or a harmonics thereof, at least one of a concurrent pulses emitted from sensors by the target feature pattern or event, with at least one an empirically determined the nodes in the last array that responds most rapidly and maximally to a minimized total duration of pulses emitted by at least one of the target feature pattern and moving target event;

wherein said minimized total duration of pulses results from a looming size or a relative parallax of the target as it nears the sensor array with increased an optical flow, so that as the sensor array reduces the distance in steps to zero nearest the target, the reemitted pulse frequency increases, thereby increasing a temporal and spatial resolution emitted by said pulses by the sensors at a target location, which increases at least one of the precision and accuracy of target location, identification, categorization, recognition and extracted abstractions.

* * * * *